United States Patent [19]

Wallace

[11] Patent Number: 4,651,094
[45] Date of Patent: Mar. 17, 1987

[54] ACCURACY CONTROL SUBSYSTEM

[76] Inventor: John Wallace, Rte. 2, Box 113, Weyers Cave, Va. 24486

[21] Appl. No.: 631,562

[22] Filed: Jul. 16, 1984

[51] Int. Cl.⁴ .................... G01N 27/72; G01R 33/12
[52] U.S. Cl. .................... 324/233; 324/239; 324/240
[58] Field of Search ............... 324/227, 232, 233, 234, 324/235, 236, 239, 240

[56] References Cited

U.S. PATENT DOCUMENTS 4,326,166  4/1982  Pigeon ........................... 324/233 X

FOREIGN PATENT DOCUMENTS 1512201  5/1978  United Kingdom .
2078965  1/1982  United Kingdom .
2086057  5/1982  United Kingdom .

Primary Examiner—Reinhard J. Eisenzopf
Assistant Examiner—Robert W. Mueller
Attorney, Agent, or Firm—Robin, Blecker & Daley

[57] ABSTRACT

An accuracy control subsystem for an object examination (OE) system is disclosed. The OE system is of typical frequency-based type and includes a drive unit for generating an excitation signal of preselected frequency, a transducer for receiving the excitation signal and for applying it to the object and for generating an output signal indicative of interaction of the excitation signal with the object and a detector for receiving the transducer output signal and for generating first and second output signals respectively indicative of components of the transducer output signal at first and second different phases thereof, typically zero degrees and ninety degrees, i.e., in-phase and quadrature, respectively. The accuracy control subsystem includes circuitry for receiving the detector first and second output signals and self-operable in predetermined pattern for generating first and second phase component correction signals to conform operation of the detector to within a preselected operating subrange thereof and circuitry connected within the detector for combining the first and second phase component correction signals with the transducer output signal.

8 Claims, 15 Drawing Figures

ACCURACY CONTROL SUBSYSTEM

FIELD OF THE INVENTION

This invention relates generally to systems for frequency-based detection of object characteristics and pertains particularly to accuracy control subsystems for such detection systems.

BACKGROUND OF THE INVENTION

In various nondestructive testing practices, an object under evaluation has a time-varying, i.e., non-zero frequency, signal applied thereto as furnished by a system oscillator. A signal is derived from the object, which signal has a carrier with modulation in accordance with object characteristics. Detection circuitry typically has a filter tuned to the oscillator frequency, an amplifier to increase signal level to a useful level, and circuitry receiving the filtered and amplified signal and developing two signals therefrom indicating its constituency at different phases. In general, the zero degree phase (sine) and the ninety degree phase (cosine) are selected and the two developed signals are then called the in-phase and quadrature components of the detected object signal and provide a complete set of information in the one frequency at hand.

Departures from true ninety-degree separation between the in-phase and quadrature signals, called "quadrature error", results in output information which is inaccurate, since microprocessors and the like, processing the in-phase and quadrature signals to develop output information, necessarily treat same as having true ninety-degree separation.

In the detection circuitry, phase shift is introduced by required filtering and amplification of the signal derived from the object, giving rise to quadrature error both from resulting phase difference in in-phase itself as against oscillator zero-degree phase and from other than true ninety-degree separation between in-phase and quadrature.

A typical frequency-based detection system of the type described above is the basic eddy current system used to determine characteristics, such as electrical conductivity, of metal stock. Here, a coil defines a central passage for insertion of a known sample of the stock and is excited by an oscillator. A detector receives an input signal from the coil and yields in-phase and quadrature output signals. Polar presentation information is developed from these output signals, i.e., a vector magnitude and an angle, and an oscilloscope presents the corresponding polar display.

A so-called "balancing" practice is required at the outset of use of such eddy current system and the general system as well. In this practice, one forces the system into a subrange of the overall operational range of the system, such that signal processing to the point of generation of the in-phase and quadrature output signals occurs without confronting saturated circuitry. The subrange is thus to extend from the system origin in X and Y. Typically, the actual system null, prior to balancing, is substantially off-null in X or Y or both.

In present practice, balancing is done manually by an operator. The operator moves the standard object through the coil and adjusts a potentiometer while observing the display screen until a potentiometer setting is reached at which the standard object provides a display which stays in-range throughout object movement in the coil. This practice, while time-consuming and burdensome, effects an injection into the detector circuitry of a fixed offset voltage for summation with the object derived signal to avert quadrature error attending system operation in saturated range.

Even given this laborious initial system setup, quadrature error arises from X and Y gain differences inherent in the operating subrange. In applicant's view, the art has not heretofore provided method and system achieving quadrature correction in degree providing comfort to the user demanding highly accurate output information from frequency-based object examination systems. Nor, in applicant's view, has this field of endeavor heretofore realized meaningful benefit of microprocessor capability currently available in addressing quadrature error elimination. Finally, in respect of such microprocessor capability, applicant is of the persuasion that artisans in the subject field are remiss in not realizing computer-assist to the extent of validating system generated information.

SUMMARY OF THE INVENTION

The primary object of the present invention is to provide an accuracy control subsystem for use with frequency-based object examination systems to effect enhanced elimination of quadrature error.

A further object of the invention is to provide improved method and subsystem for expeditious balancing of frequency-based object examination systems.

Another object of this invention is to provide method and system for effecting quadrature error correction throughout operational subranges of frequency-based object examination systems.

A still further object of this invention is to provide computer-effected validation of output information of frequency-based object examination systems.

In attaining the foregoing and other objects, the invention provides an accuracy control subsystem for an object examination system, the latter being referred to for convenience as an OE system. The OE system is of typical frequency-based type and includes drive means for generating an excitation signal of preselected frequency, transducer means for receiving the excitation signal and for applying same to the object and for generating an output signal indicative of interaction of the excitation signal with the object and detector means for receiving the transducer means output signal and for generating first and second output signals respectively indicative of components of the transducer means output signal at first and second different phases thereof, typically zero degrees and ninety degrees, i.e., in-phase and quadrature, respectively.

The accuracy control subsystem includes means for receiving the detector means first and second output signals and self-operable in predetermined pattern for generating first and second phase component correction signals to conform operation of the detector means to within a preselected operating subrange thereof and means connected within the detector means for combining the first and second phase component correction signals with the transducer means output signal.

In another aspect, the accuracy control subsystem includes means for injecting into the detector means of in-phase and quadrature signals and for determining nonlinearity correction for the detector means output signals. Here, plural signals are separately conveyed into the detector means and the detector means output resulting from such signals are processed to provide calibration factors for use with data derived from actual object examination.

In a further aspect, the accuracy control subsystem includes means receptive to information concerning externally determinable characteristics of the transducer and object for computing a latent object characteristic, independently of the transducer excitation and output signals, thereby providing a base for validation of the transducer-generated information regarding the object latent characteristic.

The foregoing and other features of the invention will be further understood from the following detailed description of the preferred embodiment thereof and from the drawings, wherein like reference numerals identify like components throughout.

DESCRIPTION OF PREFERRED EMBODIMENTS AND PRACTICES

General OE System

In introducing the subsystem of the invention, reference will be made to a particular type of object examination system, which itself is the subject of copending commonly-assigned patent application Ser. No. 631,563, of applicant, filed concurrently with this application and entitled "Multi-Frequency Eddy-Current System and Method". While that OE system is an eddy-current based system, the accuracy control subsystem of this invention may be employed in other OE systems and reference to such eddy-current OE system is intended as simply illustrative. Such OE system is shown in FIG. 1.

Figure 1:
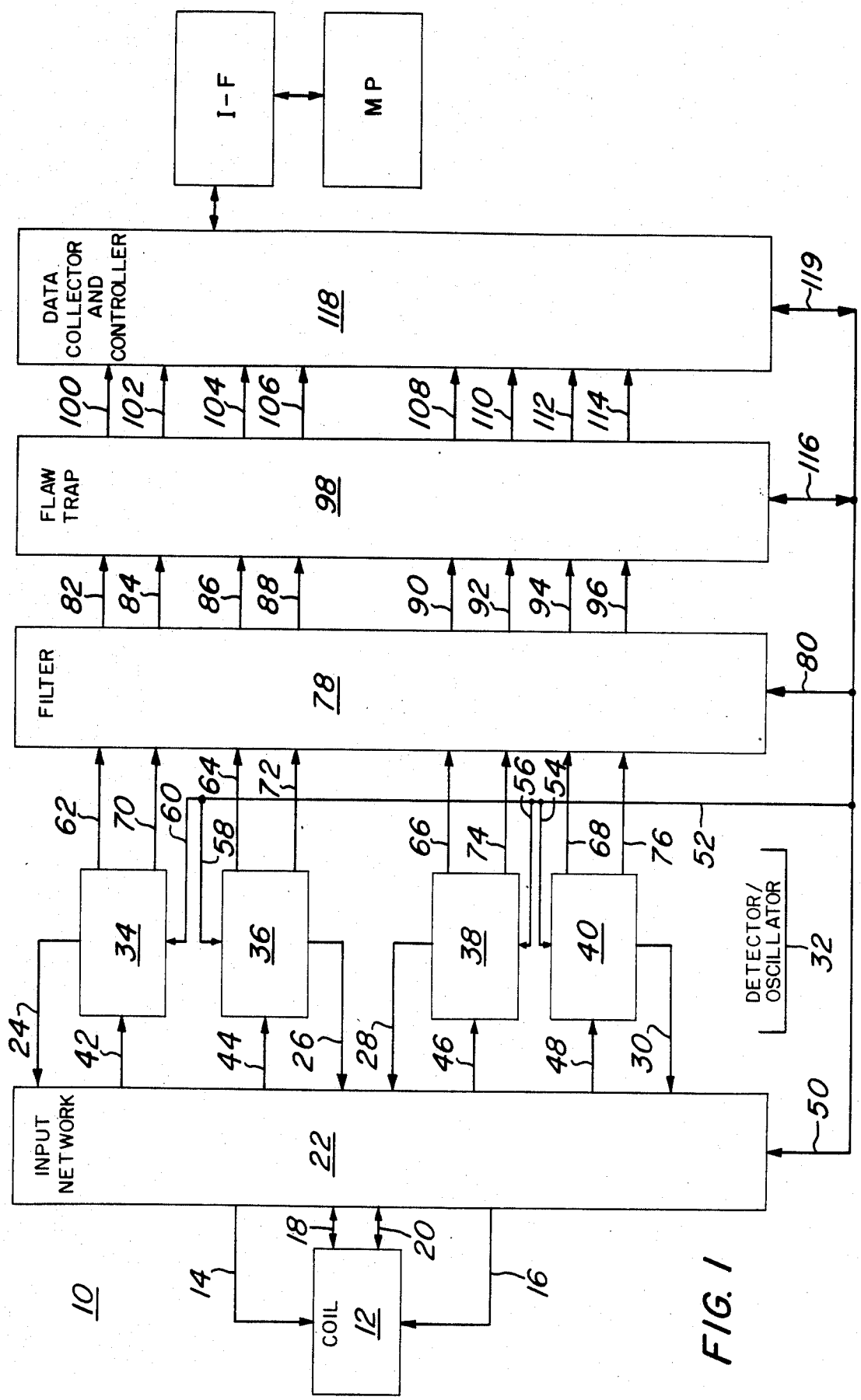
FIG. 1 is a block diagram of an OE system incorporating the subsystem of the invention.

Referring to FIG. 1, system 10 includes coil 12, which may be of single winding or plural winding type. In the latter type, the primary winding is excited over lines 14 and 16 and the secondary winding applies its output signals to lines 18 and 20. Where a single winding coil is used, the winding is connected across lines 18 and 20 and lines 14 and 16 are not used.

Either of the foregoing types of coils may be constructed, for improved measurement accuracy, in accordance with copending commonly-assigned U.S. patent application Ser. No. 631,484 of applicant herein, entitled "Compensated Transducer and System", filed concurrently herewith. In this referenced application, a transducer for magnetic testing has coil structure employing a first winding of given length and a second winding which has the same length as the first winding but wherein one-half of the second winding is in reverse winding direction to the other half, both such winding parts being of equal turns. Two such coil structures are arranged in a bridge circuit, the first winding of one coil structure being series-connected with the second winding of the other structure, and vice versa. Thermal resistivity change is thus compensated for, and inductive drift may be greatly reduced by deposition of the coil structures upon a substrate selected to have a substantially lower thermal expansion coefficient than the metal of the coil structures and sufficiently greater in thickness than the metal to effectively give rise to lessened coil structure dimensional change due to temperature.

Input network 22 serves to coact with coil 12 and further to provide selective filtering and attenuation of coil output signals. In addition to its connection to lines 14–20, network 22 receives input signals on lines 24, 26 and 28 and 30 from detector-oscillator unit 32, which includes individual channels having detector-oscillators 34, 36, 38 and 40. The output signals of network 22 are furnished over lines 42, 44, 46 and 48 to unit 32. An input control signal for a calibration mode, discussed in detail below, is provided on line 50 to network 22.

Detector-oscillators 34–40 receive input control signals for the calibrate mode and for a balance mode over lines 52, 54, 56, 58 and 60. The output signals of detectors-oscillator 34–40 are applied in zero-degree or in-phase (sine) to lines 62, 64, 66 and 68 and in ninety-degree or quadrature phrase (cosine) to lines 70, 72, 74 and 76. These lines provide inputs to filter 78, which receives input control signals over lines 80.

The output signals of filter 78 are provided on lines 82, 84, 86, 88, 90, 92, 94 and 96 to flaw trap 98, which is operative, in accordance with the states of control input lines 116, to furnish on output lines 100–114 either all or selected parts of the input signals on lines 82–96.

Data collector and controller unit 118 processes the signals on lines 100–114 and communicates with microprocessor MP through interface I-F. Unit 118 furnishes the various filter selection, flaw trap control and balance and calibration control signals on its output lines 119.

Input Network

Figure 2:
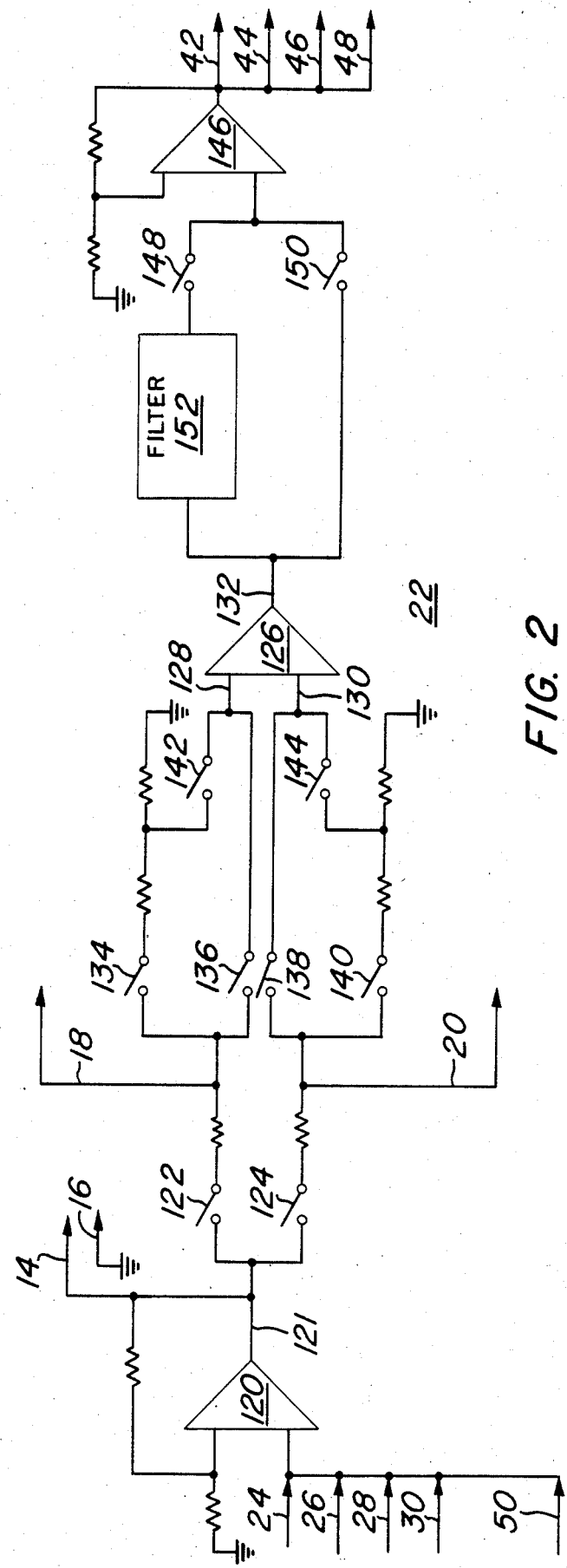
FIG. 2 is schematic diagram of the input network of the FIG. 1 OE system.

Turning to FIG. 2, input network 22 includes power driver 120, input to which is provided on lines 24–30. Output is on lines 14 and 16 where coil 12 has two windings, in which case, switches 122 and 124 are in open state. Where the system is operating with a single winding coil, switches 122 and 124 are closed and the power driver 120 output is applied to lines 18 and 20. Instrumentation amplifier 126 receives inputs on lines 128 and 130 and provides an output signal on line 132 indicative of the difference between the inputs on lines 128 and 130. Depending upon the states of switches 134, 136, 138, 140, 142, and 144, one can apply the signals on lines 18 and 20 in full or attenuated amplitude to lines 128 and 130. In full amplitude setting, only switches 136 and 138 are closed. In attenuated setting, switches 136 and 138 are open and switches 134, 140, 142, and 144 are closed.

The line 132 signal may be filtered or unfiltered as applied to operational amplifier 146, depending upon the states of switches 148 and 150. Band reject filter 152 is in series with switch 148. When switch 148 is closed and switch 150 is open, the line 132 signal is filtered in filter 152. When switch 150 is closed and switch 148 is open, the line 152 signal is applied unfiltered directly to amplifier 146. The output of amplifier 146 is applied to output lines of 42, 44, 46 and 48 of network 22.

Band reject filter 152 is of type tunable by potentiometer input over a range of twenty to twenty thousand hertz. It is also adjustable by potentimeter input to provide for equal gain above and below the band reject range.

Line 50 is set to ground potential in the calibrate mode. Driver 120 accordingly, is rendered inactive to allow calibration, discussed in detail below. Briefly, here, it can be said that calibration establishes the minus ninety degree resistive phase response axis for each of the separate frequencies of the respective channels and allows a direct phase response reference to be made.

Detector-Oscillator Unit

Figure 3:
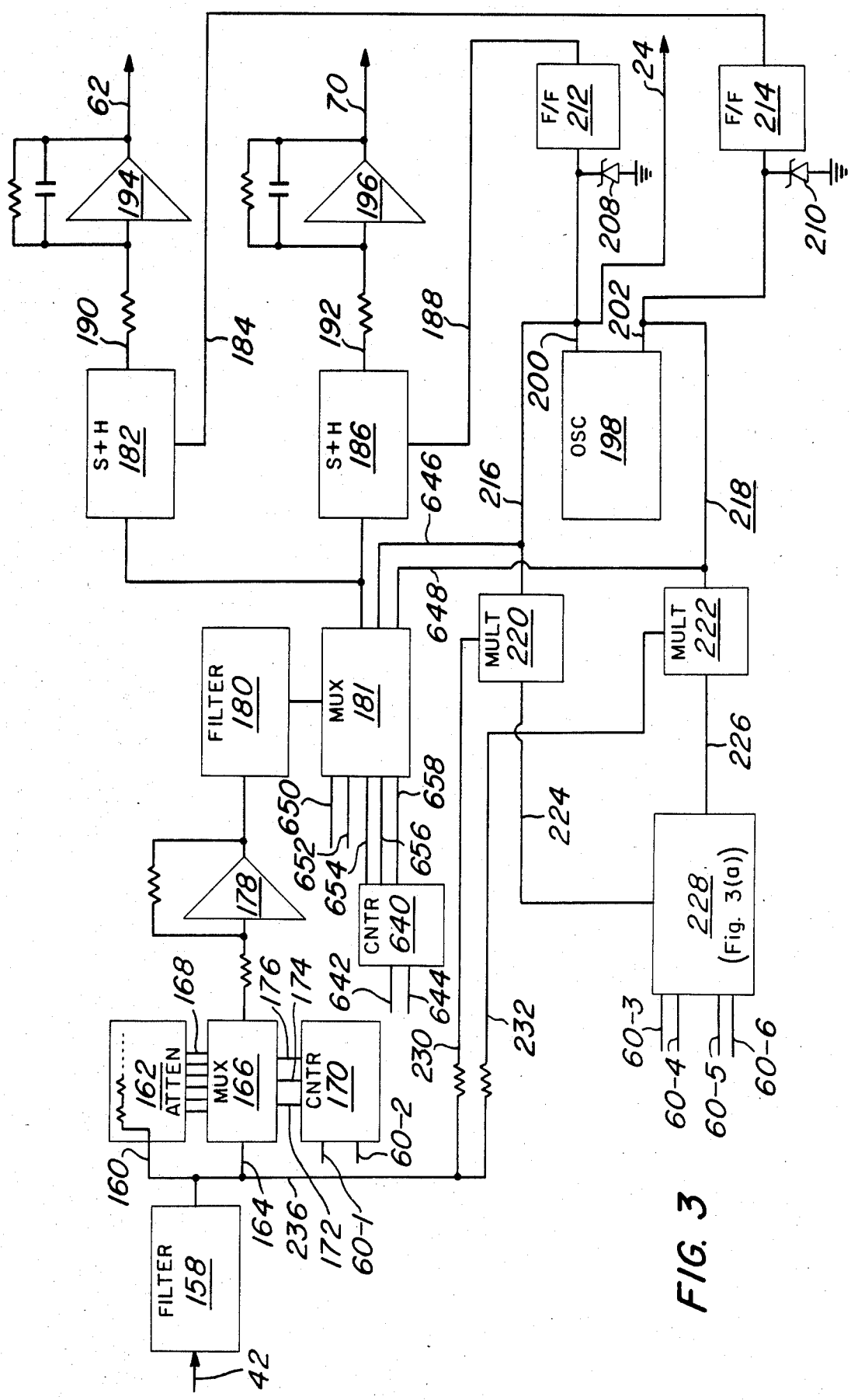
FIGS. 3 and 3(a) are schematic diagrams of the detector-oscillators of the FIG. 1 OE system.
Figure 3A:
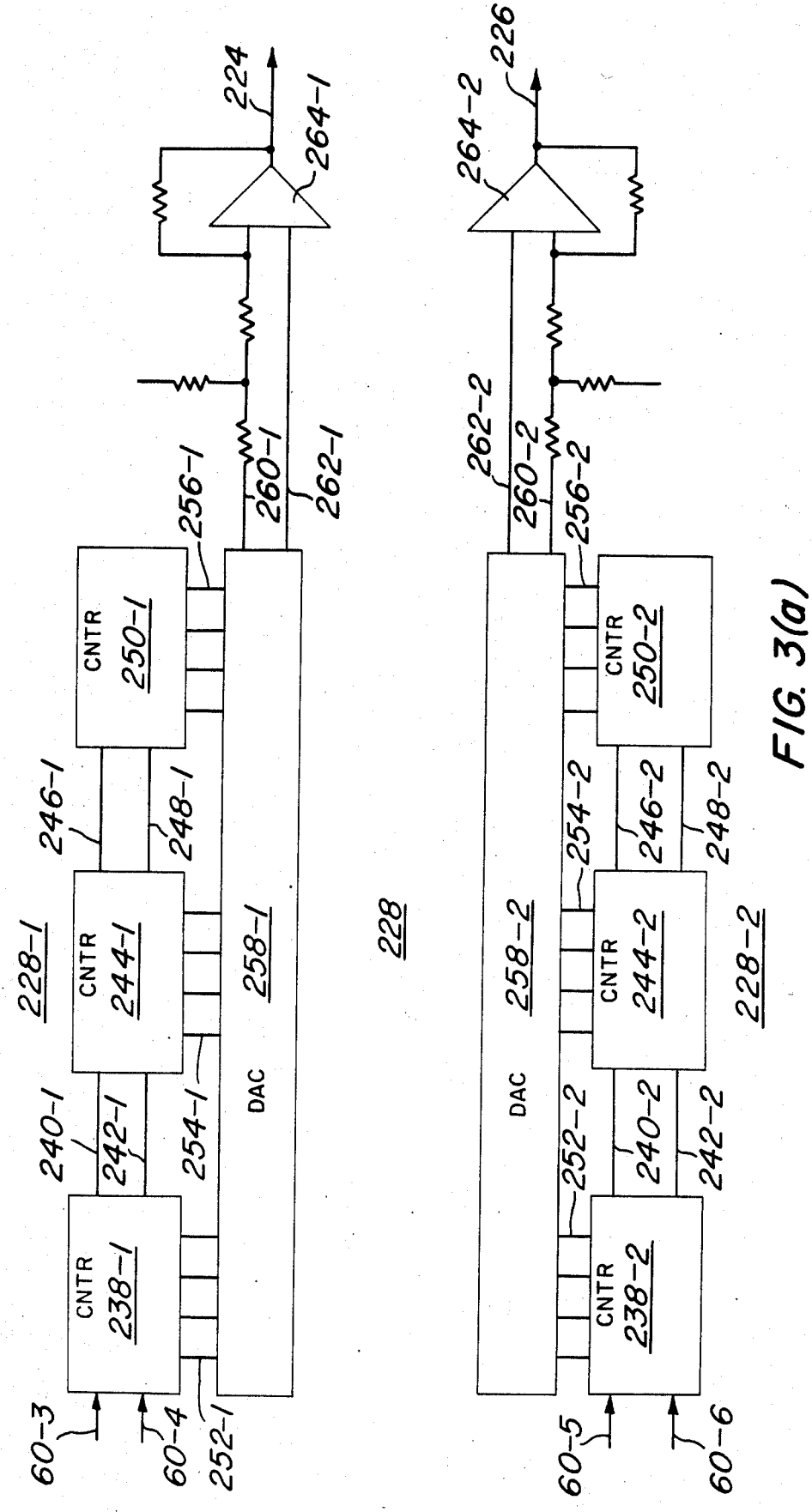

Each of detectors-oscillator units 34-40 of system 10 of FIG. 1 may be realized by the circuit embodiment of FIGS. 3 and 3(a). Considering this as detector-oscillator 34, the line 42 signal from input network 22 is applied to tuned filter 158, the output of which is applied over line 160 to attenuator 162, and over line 164 to multiplexer 166.

Each of lines 168, preferably six in number, extends from a distinct junction of the resistive ladder in attenuator 162 to multiplexer 166. Counter 170 is cleared by control input signal on line 60-2 and toggled (advanced one step) by control input signal on line 60-1. The state of counter 170 is applied to multiplexer 166 over lines 172, 174 and 176. The line 164 and 168 signals, representing different amplitudes of the output of filter 158, are thus selectable individually through multiplexer 166 in accordance with toggling of counter 170.

The output of multiplexer 166 is amplified in operational amplifier 178 and filtered in tuned filter 180. Zero-degree (in-phase) content of the output of filter 180 is stored, after passage through multiplexer 181, in sample and hold circuit 182 per control input signal thereto on line 184. Ninety-degree (quadrature) content of the filter 180 output is stored in sample and hold circuit 186 per control input signal thereto on line 188. The respective in-phase and quadrature sampled contents on lines 190 and 192 are low pass filtered in filters 194 and 196, which drive unit 34 output lines 62 and 70.

Oscillator 198 provides a zero-degree output on line 200 and a ninety-degree output on line 202. The line 200 output is applied to line 24, which provides coil excitation through input network 22 (FIG. 2).

The line 200 and 202 signals are clipped by diodes 208 and 210 to furnish inputs to monostable flip-flops 212 and 214 which control the states of sampling lines 184 and 188 above discussed. Based upon the ninety degree phase difference between the line 202 and line 204 signals, the line 184 and line 186 sample control signals will occur at corresponding time difference, thus providing for sampling of the output signal of filter 180 for in-phase and quadrature content, respectively.

Oscillator 198 output signals are applied also over lines 216 and 218 to multipliers 220 and 222. Direct current (d.c.) voltages are applied to the multipliers over lines 224 and 226 from variable d.c. controller 228, an embodiment of which is shown in FIG. 3(a) and discussed below. In response to the states of input control lines 60-3, 60-4, 60-5 and 60-6 (up and down phase toggle signals), controller 228 furnishes the line 224 and 226 signals independently of one another.

The outputs of multipliers 220 and 222 are applied over lines 230 and 232 through resistors 234 and 235 to line 236. The line 236 signal accordingly effects an offset injection of d.c. voltage by a determined amount, along with in-phase and quadrature components. The line 236 signal is injected into the line 164 input to multiplexer 166.

Turning to FIG. 3(a), injection controller 228 includes identical channels 228-1 and 228-2, respectively for in-phase and quadrative injection of d.c. voltage. The ensuing discussion of channel 228-1 will be seen as applying also to channel 228-2.

Lines 60-3 and 60-4 provide in-phase up and in-phase down toggle signals to counter stage 238-1. Lines 240-1 and 242-1, connect stage 238-1 to counter stage 244-1. Lines 246-1 and 248-1 connect counter stage 244-1 to counter stage 250-1. Stage 238-1 applies its state to lines 252-1. Stage 244-1 applies its state to lines 254-1. Stage 250-1 applies its state to lines 256-1. Digital-to-analog convertor (DAC) 258-1 receives the signals on lines 252-1, 254-1 and 256-1 and generates an analog output signal over lines 260-1 and 262-1 to operational amplifier 264-1, which drives line 224.

In the case of channel 228-2, lines 60-5 and 60-6 provide quadrature phase up and quadrature phase down toggle signals.

Filter Unit 78

Figure 4:
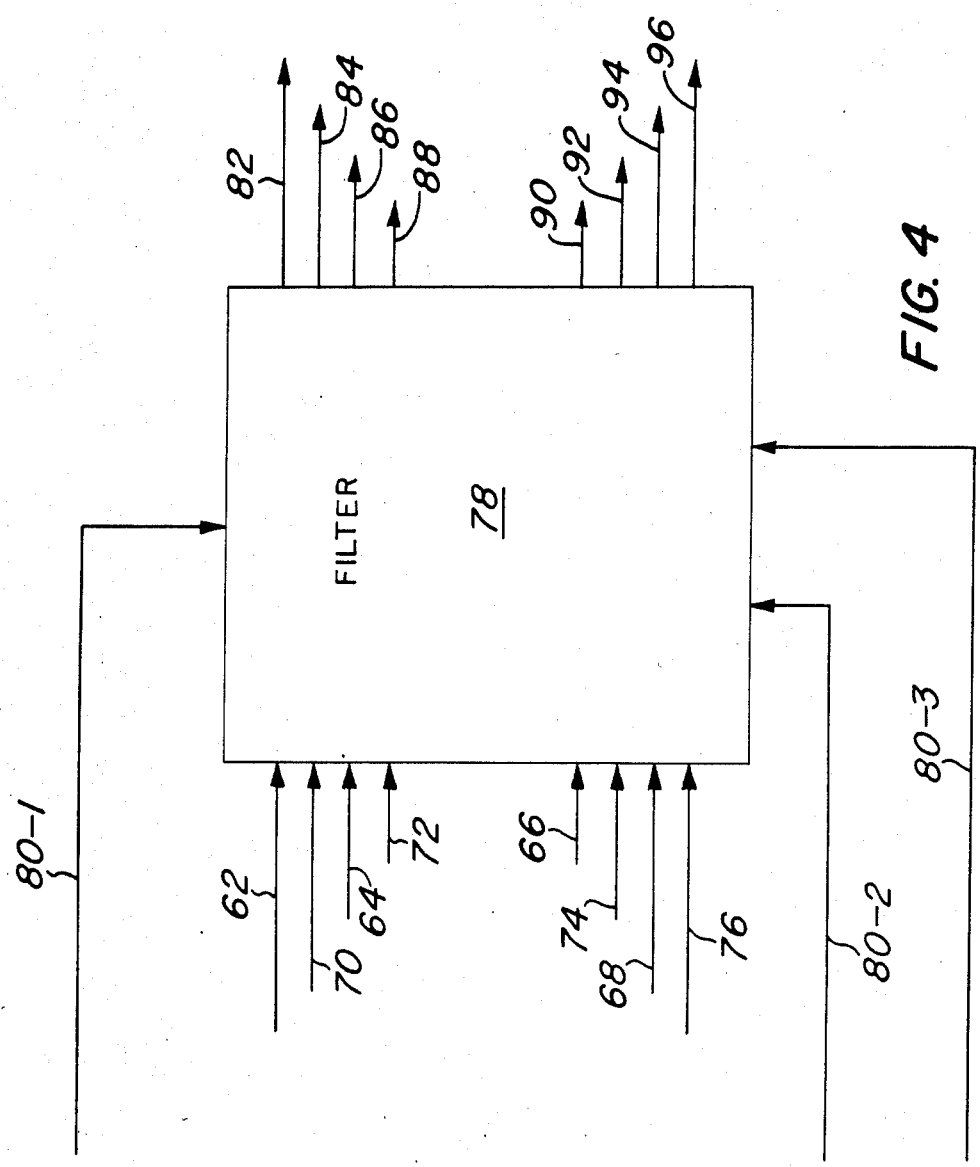
FIG. 4 is a block diagram of the filter units of the FIG. 1 OE system.

The in-phase and quadrature output signals for each of the four detector-oscillators, i.e., the signals respectively on lines 62 and 70, lines 64 and 72, lines 66 and 74 and lines 68 and 76 are applied to filter 78 (FIG. 4), which receives control input signals for directing filter operation on lines 80-1, 80-2 and 80-3. The filter is structured to function either as a low pass or band pass unit, responsively to the state of line 80-1. Four frequencies (fifteen, forty, one-hundred and fifty and four hundred hertz) may be selected from as either the upper cutoff frequency or the center band pass frequency, in accordance with the states of lines 80-2 and 80-3. Thus, with lines 80-2 and 80-3 both LO (at ground potential) and line 80-1 HI (at +5 volts d.c.), filter 78 is called on to function as a low pass filter with an upper cutoff frequency of fifteen hertz. With lines 80-2 and 80-3 both HI and line 80-1, LO, the filter is band pass with center frequency at four hundred hertz. Filter 78 provides its output signals, in channel pairs of in-phase and quadrature, on lines 82-96 to flaw trap 98.

Flaw Trap 98

Figure 5:
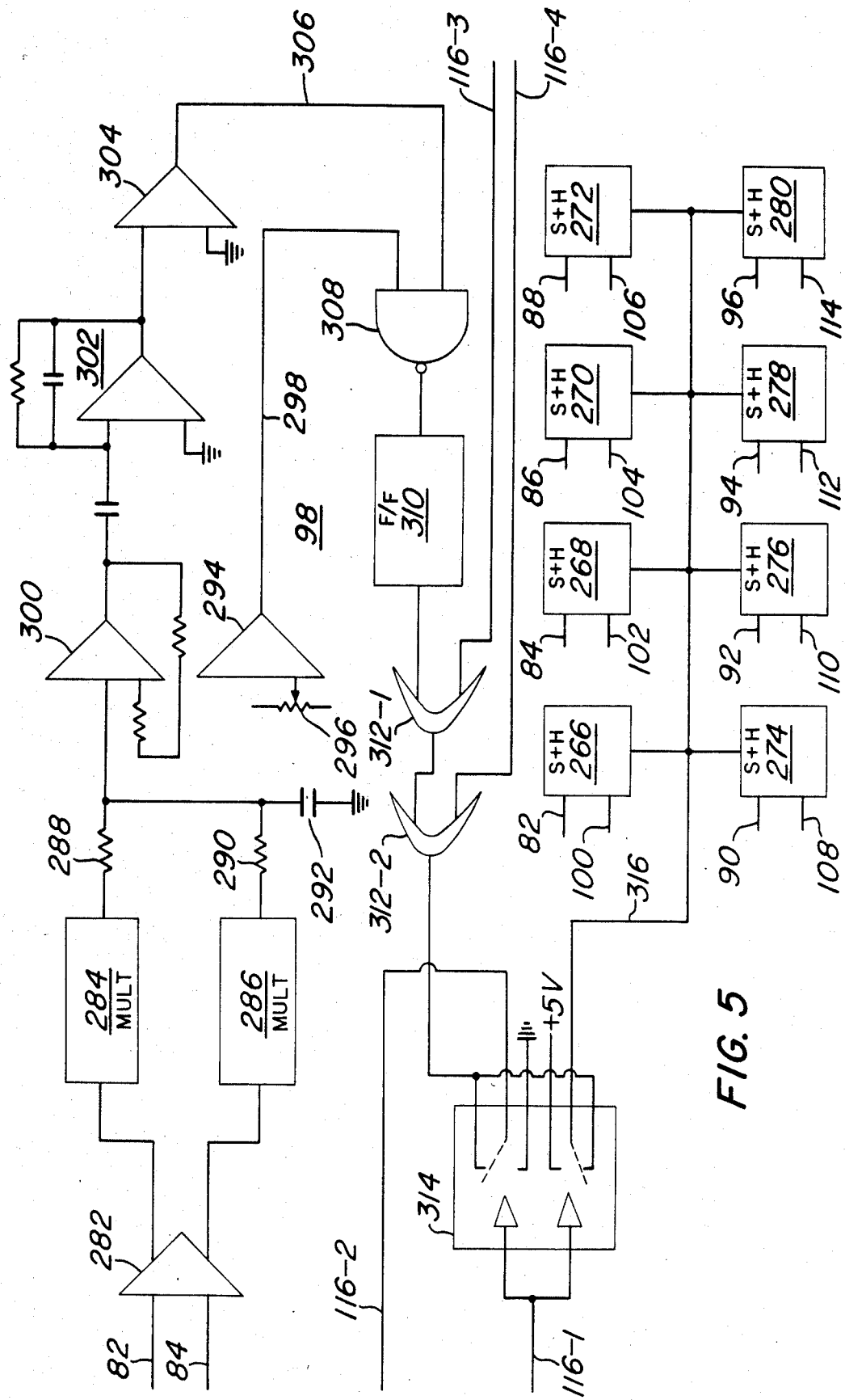
FIG. 5 is a schematic diagram of the flaw trap of the FIG. 1 OE system.

An embodiment of flaw trap 98 is shown in FIG. 5. Lines 82-96 from filter 78 are applied to sample and hold circuits 266-280. At least one pair of the in-phase and quadrature filter output signals is selected to be monitored, namely, the pair on lines 82 and 84, and these lines are applied to dual operational amplifier 282. The amplified signals are squared in multipliers 284 and 286. The squared signals are now applied to a high pass filter 288-290-292 and summed. Comparator 294 receives the summed signals and a threshold level from potentiometer 296. Output line 298 changes state when the summed signal amplitude exceeds the threshold level.

Operational amplifier 300 offsets the attenuation of the summed signal in filter 288-292 and provides a full amplitude version of the summed signal to differentiator 302 and zero-crossing detector 304. Line 306 changes state on each zero crossing and is applied with line 298 to gate 308. Gate 308 applies its output to monostable flip-flop 310 whose output is applied through gates 312-1 and 312-2, to switch 314, the state of which is controlled by line 116-1. This line is HI, when the flaw trap circuitry above discussed is to be used in providing for output information corresponding to threshold and peak levels in the line 82 and 84 signals. In the illustrated position for switch 314, line 116-1 is HI and the pulse from flip-flop 310 is conducted through switch 314 to line 316 and causes circuits 266-280 to sample and hold signals then on lines 82-96. Output signals from these circuits are applied to lines 100-114. In the alternate state of switch 314, line 316 is connected to plus 5 volts d.c. and the sample and hold circuits conduct signals continuously from input to output lines.

An output control signal of flaw trap 98 is provided on line 116-2, this being a trigger to activate analog-to-digital conversion in data collector and controller unit 118 (FIG. 1). Control inputs on lines 116-3 and 116-4 permit direct triggering of line 316 from software or external sources.

Data Collector and Controller 118

In FIGS. 6, 6(a), 6(b) and 6(c), an embodiment of data collector and controller 118 is shown. Unit 318 is a Data Aquisition Unit, such as a Burr-Brown SDM856JG. In function, unit 318 multiplexes and digitizes analog input signals, i.e., the signals applied on lines 100-114 upon control input from line 116-1 of flaw trap 98, above discussed. Control input signals on lines 320, 322 and 324 are $\overline{DS}$ (Data Strobe), $\overline{BUSY}$ and $\overline{BUSY}$ ENABLE signals. These signals and other control input signals on line 326 (BUSY) and on lines 328, 330 and 332 are generated by circuitry of FIG. 6(a) discussed below. The digital output of unit 318 is furnished on lines 334 and 336 to FIFO (first in, first out) memories 338 and 340.

The bits on lines 334 and 336 are fifteen individual bits, twelve data bits and three channel address bits. Nine lines, 334, apply nine bits to memory 338 and six lines 336 convey six bits to memory 340. As successive fifteen-bit words issue from acquisition unit 318 to the FIFO units, each prior word is shifted through and ultimately arrives at the output stages of the FIFO units. Here, portions of the partial word in FIFO 338 are applied to multiplexers 344 and 348 over lines 342 and 346, respectively. Likewise, portions of the partial word in FIFO 340 are applied respectively over lines 350 and 352 to multiplexers 344 and 348. One state of line 353 gates lines 342 and 346 to lines 354 and 356 and hence to universal asynchronous receiver/transmitter 358, which may be a UAR/T A4-3-1015D. The other state of line 353 gates lines 350 and 352 to lines 354 and 356 and thus to UAR/T 358.

UAR/T 358 is operative to transmit or receive binary data with appended control and error detecting bits. Typically, manual switches (not shown) are connected to ports of the UAR/T and are set as desired to select number of stop bits, baud.rate, bits per word, parity mode, etc.

To accommodate the particulars of the system under discussion, latches 360 and 362 receive inputs over lines 364 and 366 from UAR/T 358. The latch outputs, the meaning and use of which is covered hereinafter, are on lines 370 (channel C address), 372 (channel B address), 374 (channel A address), 376 (toggle down on auto balance), 378 (toggle up on auto balance), 380 (toggle up attenuator), 382 (clear attenuator), 384 (calibrate toggle), 386 (flaw trap enable), 388 (filter select A2), 390 (filter select A1), and 392 (filter mode select). The states of lines 370-392 are desirably set by suitable software control as discussed below.

UAR/T 358 is operative to apply output data serially to line 394 or to receive input data serially on line 396 in accordance with the state of line 398. In control of the state of line 398, a communication modem, (interface I-F in FIG. 1), such as the customary RS-232 unit, informs as to request to send or to receive by input to gate 400. Gate 402 receives the line 404 output of gate 400 and a second input from line 406. Line 406 is controlled by gate 408, the inputs to which are furnished by FIFO units 338 and 340 over lines 410 and 412. In operation, when both FIFO units have a word resident in their output stages and when there is a modem request concurrent therewith, gate 402 places its output line 414 in first logic state and such state is furnished as one input to gate 416.

UAR/T issues a readiness strobe over line 418 to monostable flip-flop 420, the output of which is applied over line 422 to gate 424. Gate 424 has a second input on line 426, which is the gate 408 output (FIFO units ready for output). The gate 424 output on line 428 is applied to gate 416. When both inputs, on lines 414 and 428, are in selected common state, gate 416 pulses output line 430 and monostable flip-flop 432 strobes line 434, rendering UAR/T 358 operative to send data on line 394.

The state of line 353 is required to change state during each full word transmission by UAR/T 358 to effect the multiplexing of signals on lines 342, 346, 350, and 352, above discussed. Counter 436 and monostable flip-flop 438 so control line 353, as follows. Each output pulse of monostable flip-flop 420 is applied over line 440 and steps counter 436. The first counter stage output is applied to line 353. The second counter stage output is applied over line 442 to monostable flip-flop 438 to pulse its output line 444 and reset counter 436 to zero. Counter 436 accordingly changes the state of line 353 once per each two strobes on line 418.

Figure 6:
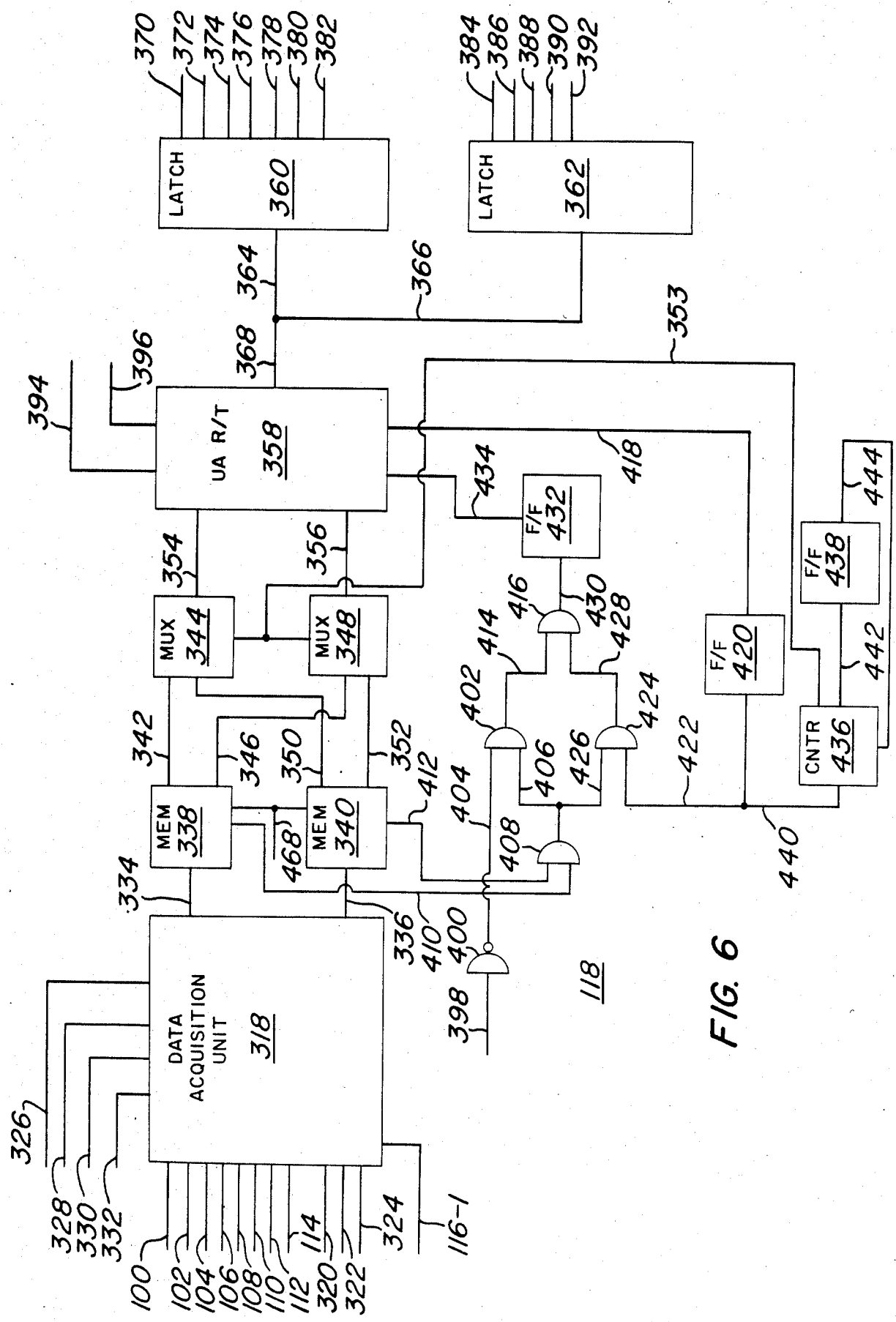
FIGS. 6, 6(a), 6(b) are schematic diagrams of the data collector and controller of the FIG. 1 OE system.
Figure 6A:
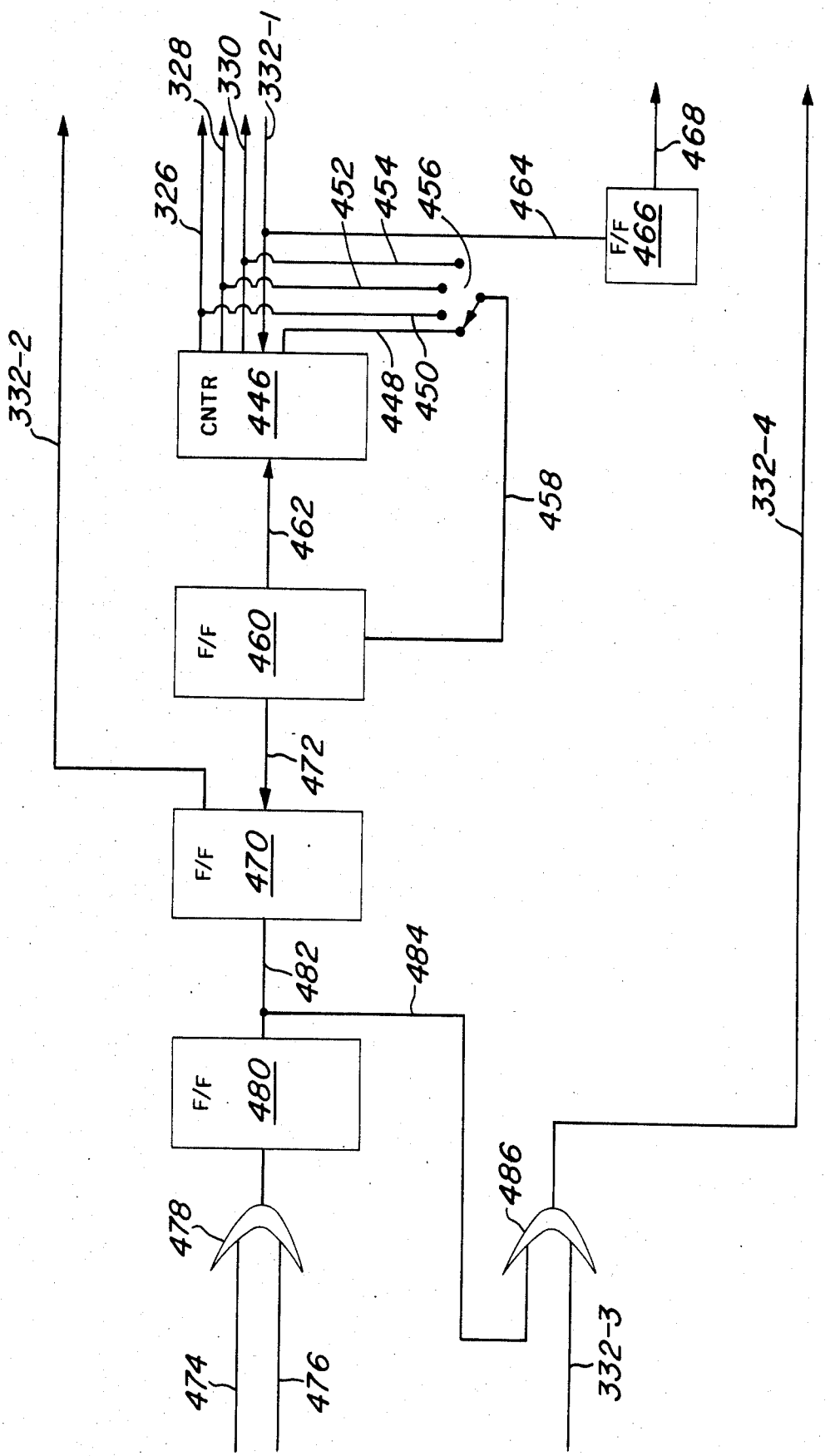

Referring now to FIG. 6(a), the generation of signals on control lines 326, 328, 330 and 332 of FIG. 6 to data acquisition unit 318 will now be discussed. Counter 446 is of four-stage type, the first, second, third and fourth stage states being present on lines 448, 450, 452 and 454, which are separate inputs to switch 456. The output of switch 456 is applied over line 458 to monostable flip-flop 460. Output line 462 of flip-flop 460 is connected to the clearing input of counter 446. Line 332-1, which is the BUSY output line of acquisition unit 318, drives the input of the counter first stage.

If switch 456 is set to line 448, the first pulse on line 332-1 will change the state of line 448, will trigger flip-flop 460 and reset the counter to zero. The channel address lines 326, 328 and 330 will not experience a change of state, and acquisition unit 318 will be informed of first channel selection (the channel having oscillator-detector 34 of FIG. 1). Conversely, if switch S1 is set to line 454, line 458 will not be pulsed until state change of the fourth counter stage. At that time, all of address lines will have changed state, and the channel address indication will be the fourth channel, (the channel having oscillator-detector 40 of FIG. 1).

In a flaw trap enable mode, acquisition unit 318 will have processed through to FIFO units 338 and 340, under line 454 setting of switch 456, sampled information at in-phase and quadrature of all four diverse frequency channels, i.e., eight distinct pieces of information.

The line 332-1 $\overline{BUSY}$ signal is applied also over line 464 to monostable flip-flop 466 whose output pulse is conveyed over line 468 to FIFO units 338 and 340 to shift into same the next word available from data acquisition unit 318.

As monostable flip-flop 460 clears counter 446, it also clears flip-flop 470 over line 472. Line 332-2 ($\overline{BUSY\ ENABLE}$) changes state to advise data acquisition unit 318 of completion of the cycle. Flip-flop 470 is preset at the outset of each cycle by an external or internal trigger on lines 474 and 476, in which cases gate 478 pulses monostable flip-flop 480 which is connected to the preset input of flip-flop 470 by line 482. The pulse on line 482 is applied over line 484 to gate 486, to which is also applied the BUSY signal on line 332-3. Gate 486 controls the state of line 332-4 ($\overline{DS}$).

Figure 6B:
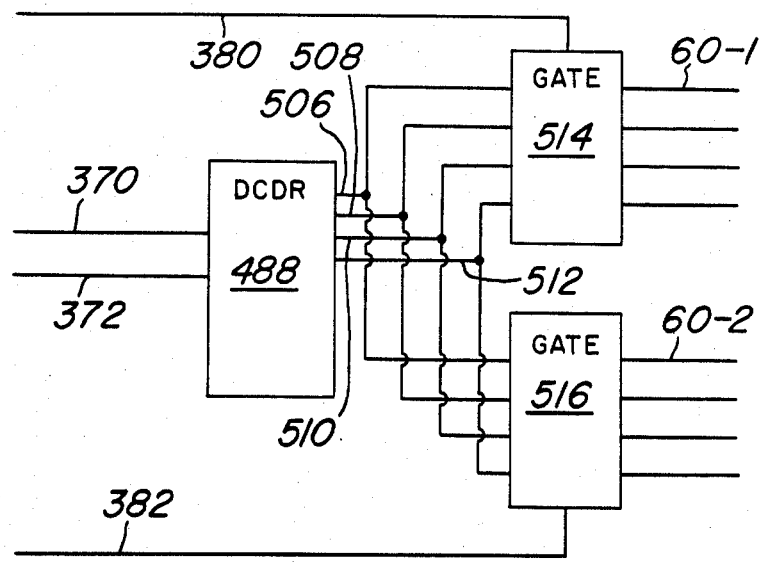

FIG. 6(b) depicts the attenuation control portion of data collector and controller unit 118. Decoder 488 receives addresses C and B on input lines 370 and 372. Output lines 506, 508, 510 and 512 provide inputs to gating unit 514, the further input to which is the attenuation toggle up signal on line 380. One of the four output lines of gating unit 514 will have a state change, in accordance with the channel being set for attenuation. The uppermost output line is noted as 60-1, corresponding to the same line in FIG. 3 i.e., the toggle attenuator line for the channel having detector-oscillator 34.

Output lines 506, 508, 510 and 512 also provide inputs to gating unit 516, the further input to which is the clear attenuator signal on line 382. One of the four output lines of gating unit 516 will have a state change, in accordance with the channel being set for attenuation. The uppermost output line is noted as 60-2, corresponding to the same line in FIG. 3, i.e., the clear attenuator line for the channel having oscillator-detector 34.

Figure 6C:
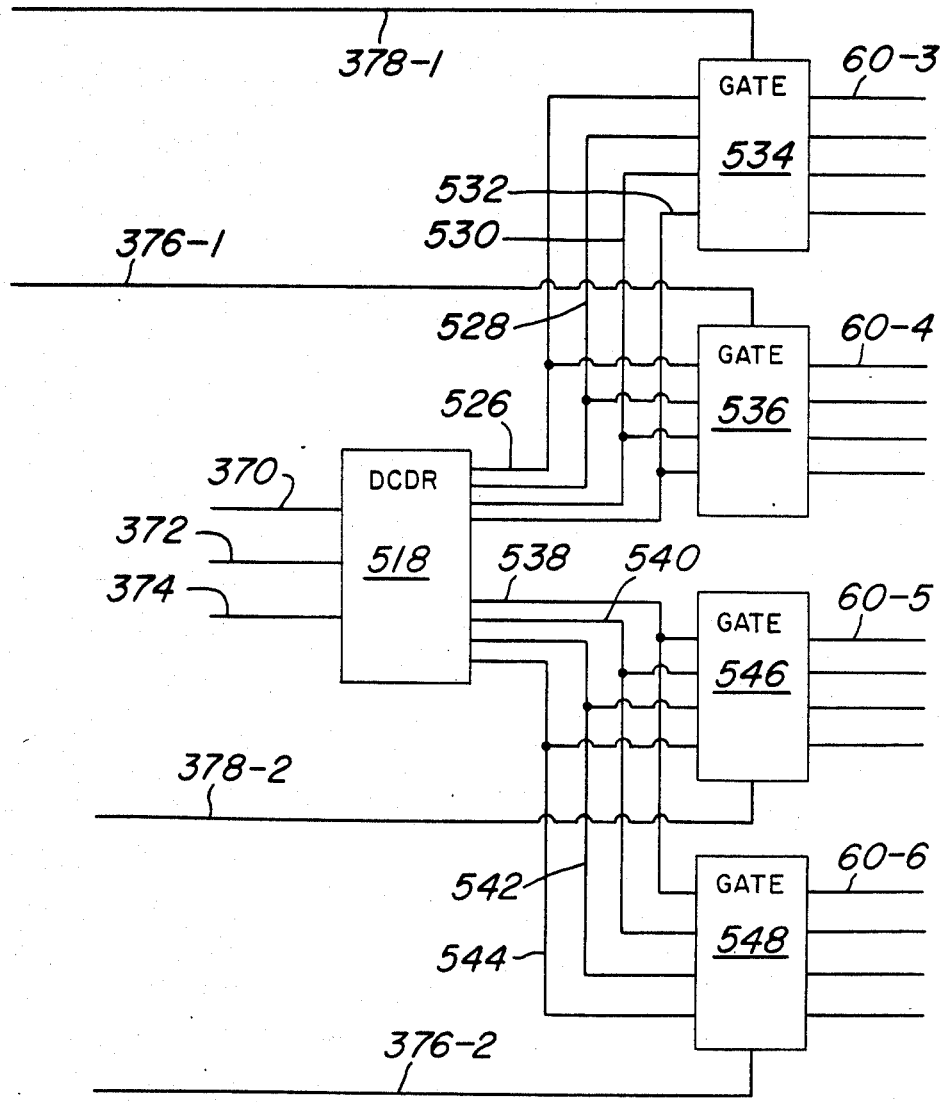

FIG. 6(c) depicts the balance control portion of data collector and controller unit 118. Decoder 518 has inputs from lines 370, 372, and 374, i.e., addresses A, B and C. Output lines 526, 528, 530 and 532 of decoder 518 extend to both of gating units 534 and 536. These gating units respectively receive control inputs of in-phase toggle up and toggle down on lines 376-1 and 378-1. The outputs of gating 534 and 536 are the in-phase control signals for the four channels, the upper output lines being lines 60-3 and 60-4, corresponding to these same lines in FIGS. 3 and 3(a).

Turning to the lower half of the balance control portion, which generates the quadrature toggle up and toggle down signals, lines 538, 540, 542 and 544 extend to gating units 546 and 548. These gating units respectively receive control inputs of quadrature toggle up and a toggle down on lines 378-2 and 376-2. The output lines are the quadrature control signals for the four channels, the upper output lines being lines 60-5 and 60-6 of FIGS. 3 and 3(a).

Balance Mode

Figure 7B:
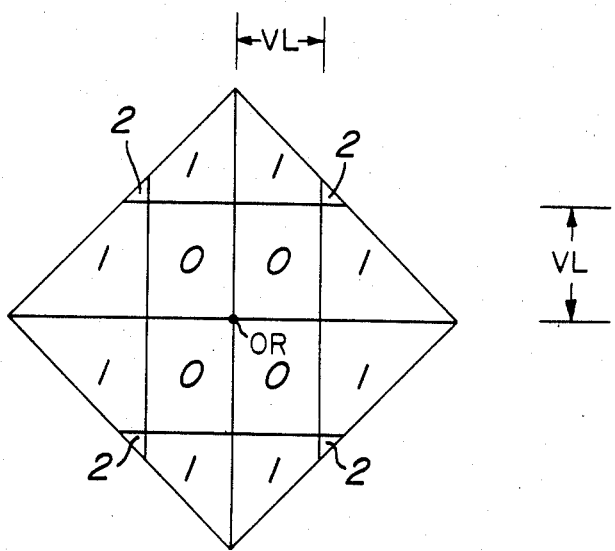
FIGS. 7(a) through 7(d) are drawings illustrative of the balancing practice of the invention.
Figure 7A:
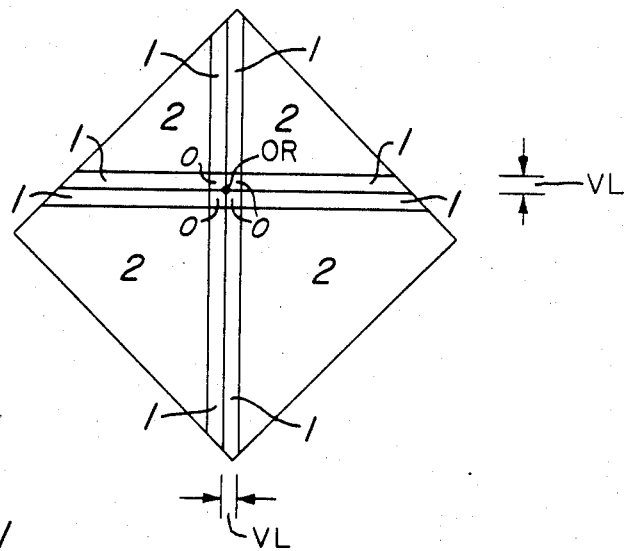

The first (MF) of the two programs listed at the end of this text includes subsections for what are termed "rough" balance, "single-sided rough" balance and "fine" balance. An understanding of same, and of applicant's method embodied therein, will be facilitated by reference to FIGS. 7(a), 7(b), 7(c), 7(d), 8 and 9. FIG. 7(a) is a plot of the operating range of the system. The vertical and horizontal extents of regions 0 from origin OR defines the desired dynamic subrange in which the system should be operated and may be selected to be a given number of units, i.e., a given voltage level VL. As will be seen from FIG. 7(a), and the enlarged view of the dynamic subrange in FIG. 7(b) in areas labelled 1, one of the horizontal and vertical components would be in-range, i.e., less than level VL. In areas labelled 2, neither component would be in-range.

Figure 7C:
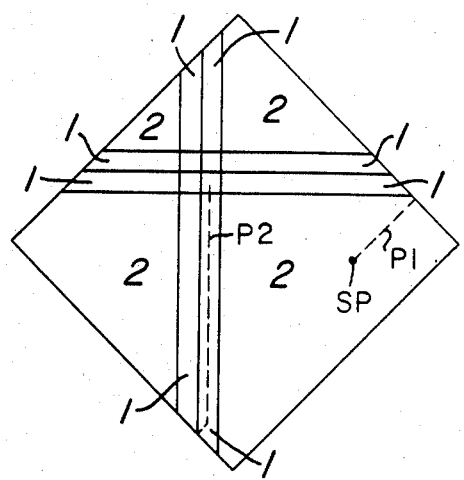
Figure 7D:
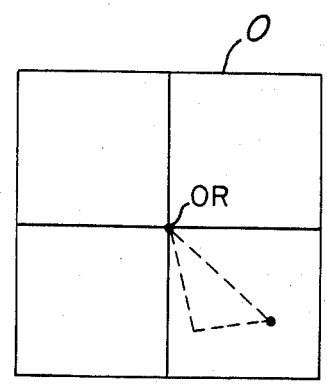
Figure 8:
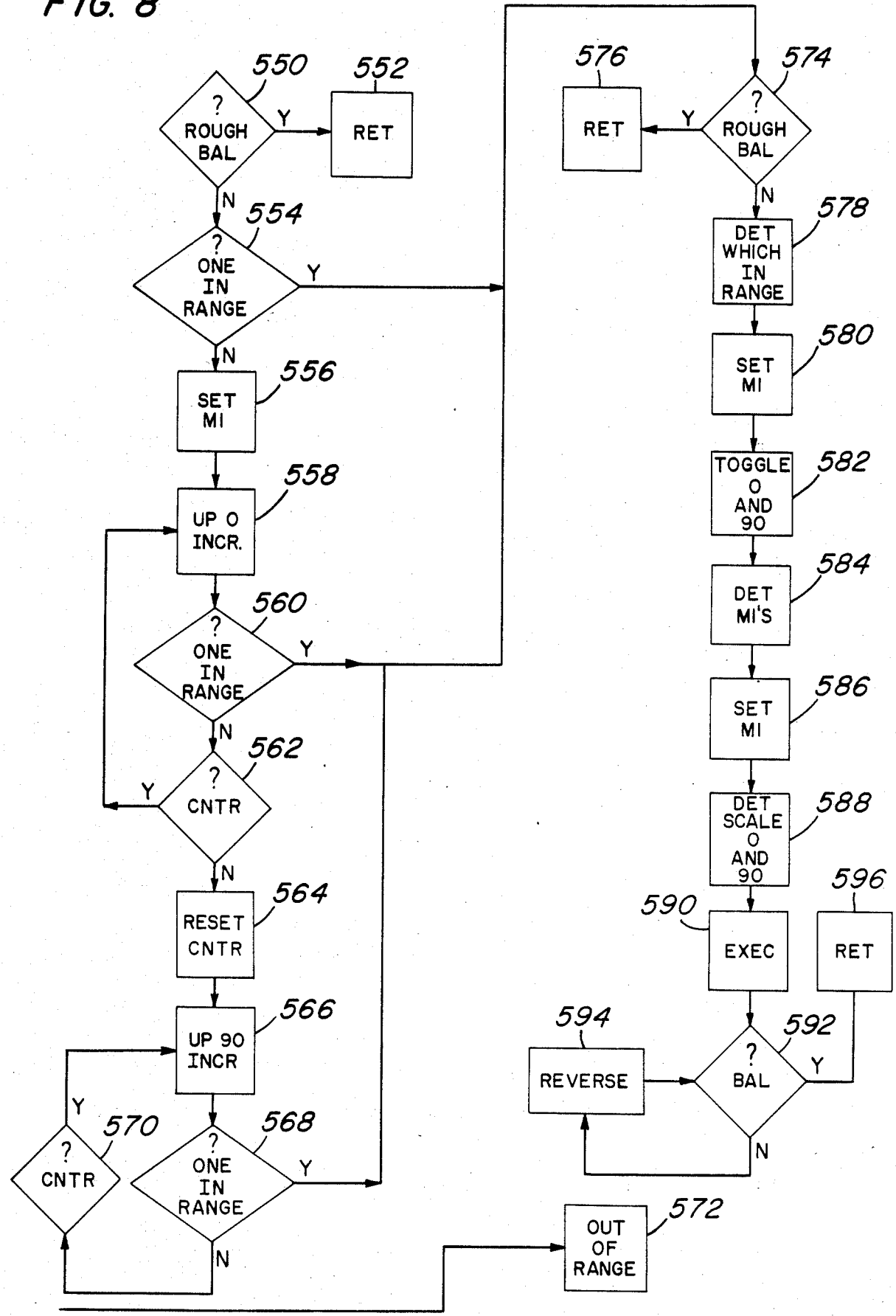
FIG. 8 is a flow chart of a program for coarse balancing.
Figure 9:
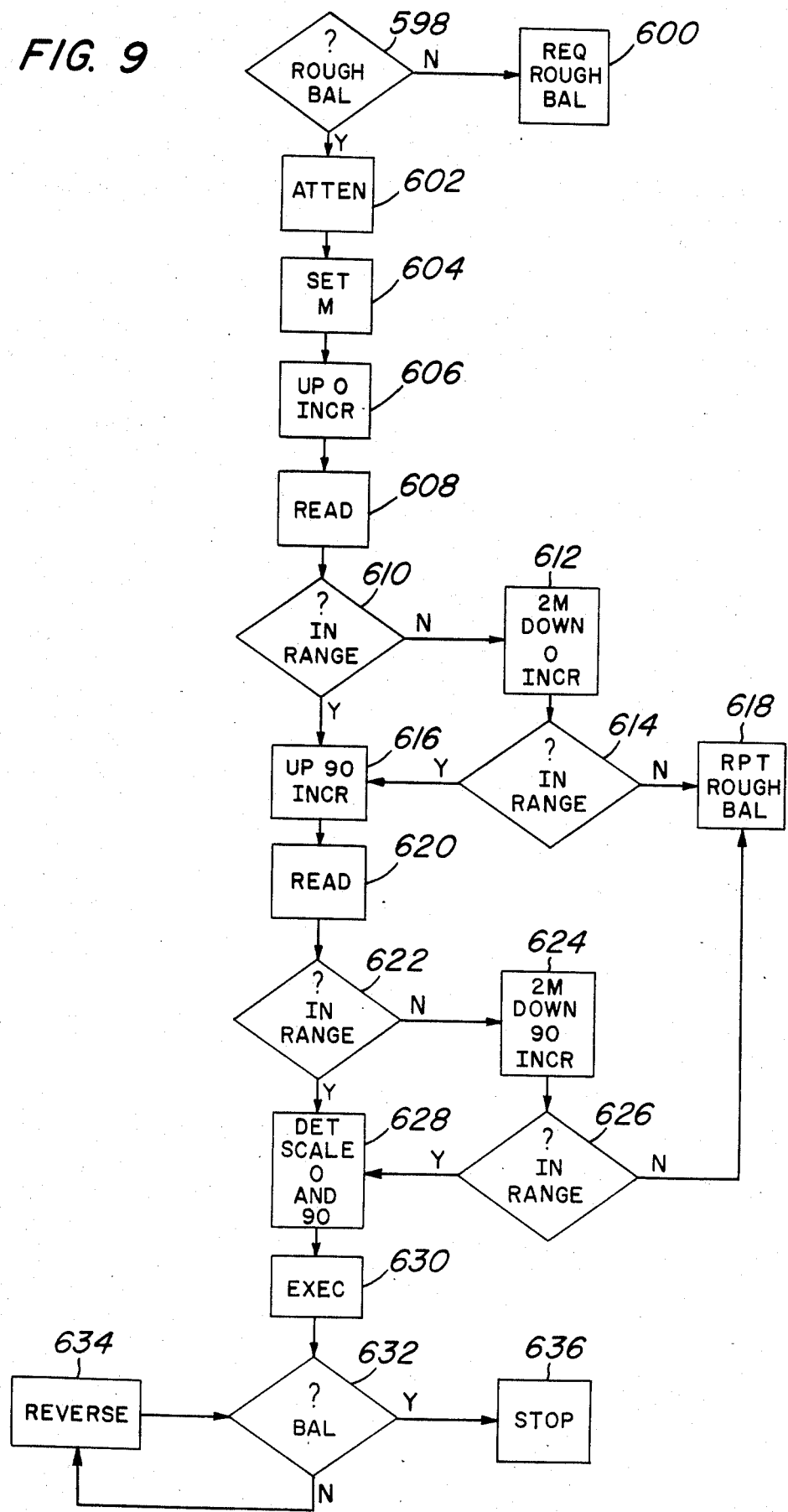
FIG. 9 is a flow chart of a program for fine balancing.

Considering the typical balance problem of FIG. 7(c), the starting point SP is in an area 2 and both components are out-of-range. Per the subject method, one proceeds initially along a path P1 to intersect the in-range area of one of the components. In upward movement from SP, one goes off screen without having entered area 1. However, upon continuing movement along P1 upon reentering the screen, one component becomes in-range. Travel is now along a second path, P2, until the second component becomes in-range. This is seen in FIG. 7(c) as the end of path P2 is in the lower right-hand quadrant of the dynamic subrange. This practice is termed "rough" balance, the flow chart of which is shown in FIG. 8. From this juncture, one proceeds in the single-sided rough balance and then to "fine" balance practice, shown in FIG. 7(d), the flow chart of which is shown in FIG. 9.

Refering to FIG. 8, and to program MF below, program step 530 calls out a key entry for balance (BAL) and an advance to step 2000. At step 2070 (550 of FIG. 8), inquiry is made as to whether either or both of the absolute values of B8 (in-phase or zero degree data) or B9 (quadrature or ninety-degree data) are less than nine hundred units (VL), i.e., whether rough balance exists. If yes for either, the program (552 of FIG. 8) advances to single-sided rough balance and then to fine balance. If no, step 2080 brings on the rough balance subsection starting at step 4000.

Step 4006 asks whether one of the data is in range (554). If no, M1 is set to one hundred and twenty-eight times the 1/(attenuator setting+1) (556) and an up zero increment occurs (558). In-range is checked again (560) and if no and if counter M1 is not exceeded in count (562), another up zero increment occurs (558). If in-range is not reached at full count, the counter is reset (564) and a ninety degree increment is made (566). In-range and count are checked through further ninety degree incrementing (568, 570). In the event that an in-range condition does not occur, output indication is provided (572).

If any one of the in-range inquiries is answered yes, (554, 560, 568), the practice proceeds to the inquiry of whether both data are in-range (574). The MF program steps are 4010–4200. Step 4210 (576) will proceed to fine balance if both data are in-range. If no, the one data in-range is determined (578), the counter is set (580) and both zero and ninety degree are incremented (582). Counter settings are determined which keep both data in-range during incrementing (584), are set (586) and scale is determined (588) and the test is executed (590). Balance (both data in-range) is now tested (592). If yes as to balance, then or after reversal (594), the practice proceeds to fine balance (596). The corresponding program steps are 4220–4610.

On return, the program is at MF step 2090 and fine balance proceeds, if a recheck of rough balance (598) does not call for a repeat (600) of rough balance. Current attenuator setting is recorded, and the attenuator is set, read and reset (602). Count is now set (604), an up zero increment is made (606) and a reading is made (608). In-range inquiry is made (610). If no, a reverse, twice-count movement, down zero increment (612) is made. In-range is checked again (614). If no, rough balance is repeated (618). If yes, an up ninety increment is made (616) and a reading is made (620). In-range inquiry is made (622). If no, a reverse, twice count movement (down) ninety increment, 624 is made. In-range is checked and, if no, rough balance is repeated. If yes, scale is determined for zero and ninety (628) and executed (630). Balance is checked (632) and if needed, a reverse is made (634), thus reaching the end (636) of the routine.

The MF Program

The MF program has various capabilities beyond the balance subroutines above discussed. In the order of their occurrence, these subroutines are as follows. The key entry of step 500 calls for the subroutine extending through steps 800–830, which permits module (channel) selection to establish conditions therein. The key entry of step 510 calls for the subroutine extending from step 7500 to 7550, which steps the attenuator of the current channel. The key entry of step 520 calls for the subroutine of steps 7400–7440, which clears the attenuator of the current channel. The key entry of step 530 calls up the balance subroutine, covered above, fine balance in steps 2000–2880 and rough in steps 4000–4630. The key entry of step 540 calls up the subroutine of steps 1000–1180 which provides for display of system settings of filters, attenuators and current data generated by the system. The key entry of step 554 calls up the filter subroutine of steps 650–780, which permits selection of filter mode and frequency and closes with the display subroutine.

Steps 900–950 provide for display of the current channel settings and data. Steps 7000–7050 effect an up zero phase step. Steps 7100–7150 effect a down zero phase step. Steps 7200–7250 perform an up ninety degree step and steps 7300–7350 a down ninety degree step. Steps 8000–8300 read system data. Steps 8500–8610 read system data for one channel. Steps 9000–9090 set up the RS-232 interface for an eight bit word, two stop bits, ninety six hundred baud and enable receiver and transmitter. Steps 9800–9850 comprise an error trap subroutine. Steps 7600–7630 and 8700–8920 set forth the CAL or calibrate subroutine of MF, this practice being next discussed in connection with the calibrate mode.

Calibrate Mode

In its calibrate mode, the system is operated with a given injection voltage applied to lines 18 and 20 of FIG. 1. This voltage is trimmed by toggle commands to a voltage of plus or minus one multivolt for a full scale signal change at the lowest setting of the attenuator 162 of FIG. 3. The gain of filter 180 of FIG. 3 is trimmed to provide equal values on the in-phase and quadrature output lines 62 and 70 (FIG. 3).

The quadrature error is now obtained by determining the angle between the signals on lines 62 and 70. The calibrate circuitry of FIG. 3 includes multiplexer 181, above noted, and counter 640. Counter 640 is stepped by the calibrate toggle signal applied thereto over line 642 and is cleared by a clear signal applied thereto over line 644. Four inputs are applied to multiplexer 181, sine and cosine from oscillator 198 over lines 646 and 648, ground over line 650 and a signal over line 652. The state of counter 640 is conveyed to multiplexer 181 over lines 654, 656 and 658. As the counter is stepped from a cleared condition, its state changes and multiplexer is stepped through its several inputs to provide measured parameters for use in implementing calibration through the following.

Inject sine $$I_0 = \begin{pmatrix} X_0 - X_G \\ Y_0 - Y_G \end{pmatrix}$$

Inject cosine $$I_{90} = \begin{pmatrix} X_{90} - X_G \\ Y_{90} - Y_G \end{pmatrix}$$

$$I_G = \begin{pmatrix} X_G \\ Y_G \end{pmatrix}$$

$$I_{DC} = \begin{pmatrix} X_{DC} - X_G \\ Y_{DC} - Y_G \end{pmatrix}$$

$$C = \frac{X_{DC} - X_G}{Y_{DC} - Y_G}$$

$$\theta_1 = \arctan\left(C \cdot \frac{Y_{90} - Y_G}{X_{90} - X_G}\right)$$

$$\theta_2 = 90 - \arctan\left(C \cdot \frac{Y_0 - Y_G}{X_0 - X_G}\right)$$

$$\tilde{M}_1 = \begin{pmatrix} \cos(-\theta_1) & \sin(-\theta_1) \\ -\sin(-\theta_1) & \cos(-\theta_1) \end{pmatrix}$$

$$\tilde{M}_2 = \begin{pmatrix} \cos(-\theta_2) & \sin(-\theta_2) \\ -\sin(-\theta_2) & \cos(-\theta_2) \end{pmatrix}$$

Data is $Z_0$, $Z_{90}$. The following steps apply.
 (1) $(Z_0, Z_{90})=) (Z_0, Z_{90} * C)$ (raw data)
 (2) $(Z_0, 0) \tilde{M}_1=) (Z'_0 Z'_{90})$ (transforms X; matrix multiplication)
 (3) $(0, Z_{90} * C) \tilde{M}_2=) (Z''_0 Z''_{90})$ (transforms Y; matrix multiplication)
 (4) $(Z_0{}^C, Z_{90}{}^C)=(Z'_0+Z''_0, Z'_{90}+Z''_{90})$ (corrected data)

Matrix multiplications are as follows:

$$(Z_0\ 0) \begin{pmatrix} \cos(-\theta_1) & \sin(-\theta_1) \\ -\sin(-\theta_1) & \cos(-\theta_1) \end{pmatrix} = \begin{matrix} (Z_0 \cos(-\theta_1), \\ -Z_0 \sin(-\theta_1)) \end{matrix}$$

$$(0\ Z_{90}) \begin{pmatrix} \cos(-\theta_2) & \sin(-\theta_2) \\ -\sin(-\theta_2) & \cos(-\theta_2) \end{pmatrix} = \begin{matrix} (Z_{90} \sin(-\theta_2), \\ -Z_{90} \cos(-\theta_2)) \end{matrix}$$

Signals indicative of these correction factors are suitably stored for use by the microprocessor which receives data from the system.

SC Program

The program SC, second listed below, was developed by applicant as an exact solution of the Maxwell field equations for a one-dimensional cylindrical geometry. The program is driven by operator prompts to provide data about the cylindrical system disposed within the field of a solenoidal eddy current encircling coil or external to a probe coil. The program generates the response of the eddy current system in a phase and amplitude format that is characteristic of the coil size, frequency, sample size and structure, and electrical conductivity centered within the coil. Units used are MKS units, except for magnetic permeability which is in relative terms with vacuum being unity. Of its many uses, SC allows a check to be performed as whether system data is valid and whether the selected frequencies of test are the optimum frequencies for inspection purposes.

Referring to the SC program below, steps 180–230 thereof permit an operator to select a measurement frequency, to enter the coil radius and to identify the number of layers in the test object. Step 330 permits the operator to set up the boundary layer problem as to the extent of the Bessel expansion. Layer radius, electrical conductivity and relative permeability are entered respectively in steps 370, 390 and 410. Steps 430–1641 are computational, solving the Maxwell field equations for the one-dimensional geometry. Readout of calculated object parameters and modification of input setup conditions are provided by the remaining steps of the SC program.

The SC program will be seen to have a wide variety of applications. In its primary use in connection with the subject invention, the SC program provides a basis for validation of data provided by the system of the invention and to assist in selection of operating frequencies to optimize the accuracy of system output data to measure electrical conductivity, magnetic permeability, specimen dimensions and flaw identification.

MF PROGRAM LISTING

```
10 OPTION BASE 0@ DEG
15 COM M9(4),L1,L2,L3,L7,L4,L5, L6,M,C(50,9), C1(50,9)
20 DIM D(6,6),Q(5),O1(4),O2(4),O3(4),O4(4),O5(4),O6(4),
   O7(4),),O8(4),O9(4),B(16),S$[16]
25 DIM T9(6),Z1(3),22(3),Z3(3),
   Z4(4),T8(6)
30 L1=156 @ L3=00 @ L4=0 @ L7=3
35 FOR 1=1 TO 4
36 M9(1)=0   NEXT 1
40 ON ERROR GOTO 9800
50 O1(1)=87
60 O1(2)=215
70 O1(3)=119
80 O1(4)=247
90 O2(1)=95
100 O2(2)=223
110 O2(3)=127
120 O2(4)=255
130 O3(1)=79
140 O3(2)=207
150 O3(3)=111
160 O3(4)=239
170 O4(1)=23
180 O4(2)=151
190 O4(3)=55
200 O4(4)=183
210 O5(1)=31
220 O5(2)=159
230 O5(3)=63
240 O5(4)=191
250 O6(1)=15
260 O6(2)=143
270 O6(3)=47
280 O6(4)=175
290 O7(1)=29
300 O7(1)=157
310 O7(3)=61
320 O7(4)=189
330 O8(1)=31
340 O8(2)=159
350 O8(3)=63
```

```
360 O8(4)=191
370 O9(1)=27
380 O9(2)=155
390 O9(3)=59
400 O9(4)=187
470 GOSUB 9000
490 CLEAR
500 ON KEY# 2," MOD# " GOSUB 800
510 ON KEY# 3," TOG " GOSUB 7500
520 ON KEY# 4," CLEAR " GOSUB 7400
530 ON KEY# 5," BAL  " GOSUB 2000
550 ON KEY# 1, "STATUS" GOSUB 1000
552 ON KEY# 9, "CAL" GOSUB 7600
553 ON KEY# 8, "PROGRAMS" GOTO 3000
554 ON KEY#7, "FILTER" GOSUB 6500
555 CLEAR
560 M=1
565 GOSUB 1000 @ KEY LABEL
580 ENABLE KBD 160 @ GOTO 580
650 CLEAR @ DISP "ENTER 0 FOR LOW PASS FILTER"
660 DISP "ENTER 1 FOR BAND PASS FILTER"
670 ENABLE KBD 255 @ INPUT L5
675 IF L5=0 OR L5=1 THEN 690 ELSE 650
690 IF L4=0 and L5=1 THEN L1=L1-4
700 IF L4=1 AND L5=0 THEN L1=L1-4
720 L4=L5
730 DISP "ENTER FILTER FREQUENCY"
732 DISP "ENTER 0 FOR 15 HERTZ"
734 DISP "ENTER 1 FOR 40 HERTZ"
736 DISP "ENTER  2 FOR 150 HERTZ"
738 DISP "ENTER 3 FOR 400 HERTZ"
740 INPUT L6
745 IF L6=0 OR L6=1 OR L6=2 OR L6=3 THEN 750 ELSE CLEAR @ GOTO 732
750 L1=L1+8*(L6-L7)
760 L7=L6
770 OUTPUT 10 USING "#,B"; L1
780 GOSUB 1000 @ RETURN
800 ENABLE KBD 255 ! ENTER MODULE #
810 DISP " ENTER MODULE # 1,2,3 OR 4 "
820 INPUT M
825 IF M=1 OR M=2 OR W=3 OR M=4 THEN RETURN ELSE 810
830 RETURN
900 ! DISPLAY DATA FROM CURRENT MODULE
905 CLEAR
910 DISP " CURRENT MODULE ", M
920 GOSUB 8000
930 DISP " 0 DEGREE " ,B(M*2-1)
940 DISP "90 DEGREE ", B(M*2)
945 B8=B(M*2-1) @ B9=B(M*2)
950 RETURN
1000 CLEAR ! STATUS
1010 DISP " FLAWTRAP FILTER FREQ."
1020 A$="LOW PASS "
1030 IF L4=1 THEN A$="BAND PASS"
1040 B$=" 15 HZ"
```

```
1050 IF L7=1 THEN B$=400 HZ"
1060 IF L7=2 THEN B$=150 HZ"
1070 IF L7=3 THEN B$="400 HZ"
1072 C$="DISABLED"
1074 IF L3=1 THEN C$="ENABLED"
1080 DISP C$;A$,B$
1085 DISP
1090 DISP "ATTEN      #1      #2       # 3        #4"
1000 DISP "        " ;M9(1), "          " ;M9(2);"
    "          ";M9(3);"        ";M9(4)
1105 DISP
1110 DISP " MOD#           0 DEG.        90 DEG.          "
1120 GOSUB 8000
1130 FOR I8=1 TO 7 STEP 2
1140 DISP (I8+1)/2;"           ";B(I8);"         ";B(I8+1)
1150 NEXT I8
1160 DISP
1170 DISP "CURRENT MODULE", M
1175 ENABLE KBD 255
1180 RETURN
2000 CLEAR ! BALANCE
2002 IF L4=1 THEN CLEAR @ DISP " SET FILTER TO LOW PASS AT
     400  HZ TO BALANCE " @ RETURN
2005  DISP "BALANCE OF MODULE ",M
2010 M1=128/(M9(M)+1) @ M3=M9(M)
2015 U3=0 @ U4=0
2020 GOSUB 7400 @ GOSUB 8500
2040 Z1(1)=B8 @ Z1(2)=B9
2045 FOR I6=1 TO M3
2050 GOSUB 7500 @ GOSUB 8500
2055 NEXT I6
2070 IF ABS(B8)<900 AND ABS(B9)<900 THEN GOTO 2090
2080 GOSUB 4000 ! ROUGH BALANCE
2090 GOSUB 8500 @ DISP " * "
2100 Z2(1)=B8 @ Z2(2)=B9
2110 GOSUB 7000 ! UP0
2120 GOSUB 8500
2130 Z3(1)=B8 @ Z3(2)=B9
2140 IF ABS(B8)>920 OR ABS (B9)>920 THEN M1=M1*2 @ GOSUB
     7100 @ U3=1
2145 IF U3=1 THEN M1=M1/2 @ GOSUB 8500 @ Z3(1)=B8 @
     Z3(2)=B9
2150 D1=SQR((Z3(1)-Z2(1))^2+(Z3(2)-Z2(2))^2)
2160 T9(1)=ATN2(Z3(2)-Z2(2),Z3(1)-Z2(1))
2170 T9(2)=T9(1)+180
2180 IF U3=1 THEN T5=T9(1) @ T9(1)=T9(2) @ T9(2)=T5
2220 T9(2)=T9(1)+180
2260 GOSUB 7200 ! UP90
2270 GOSUB 8500
2280 Z4(1)=B8  @ Z4(2)=B9
2290 IF ABS (B8)>920 OR ABS(B9)>920 THEN M1=M1*2 @ GOSUB
     7300 @ U4=1
2300 IF U4=1 THEN GOSUB 8500 @ Z 4(1)=B8 @ Z4(2)=B9 @
     M1=M1/2
2310 D2=SQR((Z4(1)-Z3(1))^2+(Z4(2)-Z3(2))^2)
2320 T9(3)=ATN2(Z4(2)-Z3(2),Z4(1)-Z3(1))
```

```
2330 T9(4)=T9(3)+180
2340 IF U4=1 THEN T5=T9(3) @ T9(3)=T9(4) @ T9(4)=T5
2390 DISP T9(1), T9(2), T9(3), T9(4)
2500 T9(5) =ATN2(Z1(2)-B9,Z1(1)-B8)
2510 FOR I=1 TO 5
2520 IF T9(I)<0 THEN T9(I)=T9(I)+360
2530 IF T9(I)>360 THEN T9(I)=T9(I)-360
2540 NEXT I
2520 FOR I=1 TO 4
2560 T8(I)=T9(5)-T9(I)
2570 IF T8(I)>180 THEN T8(I)=T8(I)-360
2580 IF T8(I)<-180 THEN T8(I)=T8(I)+360
2590 NEXT I
2600 T7=1
2610 A=ABS(T8(1))
2620 FOR I=1 TO 3
2630 A=MIN(A,ABS(T8(I+1)))
2640 IF A=ABS(T8(I+1)) THEN T7=I+1
2650 NEXT I
2660 A=ABS(T8(1))
2670 T6=1
2680 IF T7=1 THEN A=ABS(T8(2)) @ T6=2
2690 FOR 1=1 TO 3
2700 IF T7=I+1 THEN GOTO 2730
2710 A=MIN(A,ABS(T8(I+1)))
2720 IF A=ABS(T8(I+1)) THEN T6=I+1
2730 NEXT I
2740 D4=SQR((B8-Z1(1)∧2+(B9-Z1(2))∧2)
2750 IF T7=1 OR T7=2 THEN D3=D1/M1 ELSE D3=D2/M1
2760 IF T6=1 OR T6=2 THEN D5=D1/M1 ELSE D5=D2/M1
2770 D7=INT(D4/D3*COS(T8(T7)))
2780 D6=INT(D4/D5*COS(T8(T6)))
2790 DISP D4/D3,D4/D5
2800 DISP T9(5)
2810 IF ABS (T8(T7))>80 THEN GO TO2840
2820 M1=D7
2825 IF M1>2048 THEN M1=4096-M1 @ GOTO 2835
2830 ON T7 GOSUB 7000,7100,7200,7300 @ GOTO 2840
2835 ON T7 GOSUB 7100,7000,7300,7200
2840 IF ABS(T8(T6))>80 THEN GOTO 2870
2850 M1=D6
2860 ON T6 GOSUB 7000,7100,7200,7300
2870 GOSUB 900
2880 RETURN
3000 CLEAR ! MULTIPLE PROGRAM ACQUISTION
3005 DISP " YOU MAY BY PRESSING  KEYS K1, K3 OR K6 BRING
     IN ANOTHER PROGRAM"
3006 DISP "WHILE RETAINING THE SYSTEM STATUS AND DATA IN
     CURRENT MEMORY "
3010 ON KEY# 1, "CURRENT" GOTO 490
3030 ON KEY# 3, "MONITOR" GOTO 3550
3060 ON KEY#6, " SC " GOTO 3700
3090 KEY LABEL
3100 GOTO 3100
3700 CHAIN " SC "
4000 ! ROUGH BALANCE
```

```
4005 GOSUB 8500
4006 IF ABS (BS)<800 OR ABS(B9)<800 THEN 4200
4010 M1=128
4020 V8=0
4030 V8=V8+1
4040 IF V8<32 THEN 4090
4050 GOSUB 7000 ! UP0
4060 GOSUB 8500
4070 IF ABS(BB)>800 AND ABS (B9)>800 THEN 4030
4080 GOTO 4200
4090 V8=0
4100 V8=V8+1
4110 IF V8>32 THEN 4160
4120 GOSUB 7200 ! UP90
4130 GOSUB 8500
4140 IF ABS(B8))>800 AND ABS (B9)>800 THEN 4100
4150 GOTO 4200
4160 DISP " COILS TO FAR OUT OF BALANCE "
4170 RETURN
4200 M1=25
4210 IF ABS(B8)<800 AND ABS(B9)<800 THEN GOTO 2000
4220 IF ABS(BS)<ABS(B9) THEN V7=1 ELSE V7=2
4230 IF V7=1 THEN X=B8 ELSE X=B9
4240 GOSUB 7000
4250 GOSUB 8500
4260 V6=0
4270 IF V7=1 THEN Y=B8 ELSE Y=B9
4280 IF ABS(Y)>800 THEN V6=1
4290 IF V6=1 THEN M1=50 @ GOSUB 7100 @ M1=25 @ GOSUB 8500
4300 IF V7=1 THEN Y=B8 ELSE Y=B9
4310 IF ABS(Y)>900 THEN DISP "ER B-1" @ RETURN
4320 GOSUB 7200
4330 GOSUB 8500
4340 V5=0
4350 IF V7=1 THEN Z=B8 ELSE Z=B9
4360 IF ABS(Z)>800 THEN V5=1
4370 IF V5=1 THEN M1=50 @GOSUB 7300 @ M1=25 @ GOSUB 8500
4380 IF V5=1 THEN Z=B8 ELSE Z=B8 ELSE Z=B9
4390 IF ABS(Z)>900 THEN DISP "ER B=1" @ RETURN
4500 V4=0
4510 IF Y<X AND Z<Y OR Y>X AND Z >Y THEN V4=1
4520 R9=ABS((Y-X)/(Z-Y))
4525 V3=0
4526 V3=V3+1
4530 IF R9<1 THEN M1=128 ELSE M1=128/R9
4540 IF V6=0 THEN GOSUB 7000 E1SE GOSUB 7100
4550 IF R9<1 THEN M1=128*R9 ELSE M1=128
4560 IF V5=0 AND V4=0 THEN GOSUB 7200
4570 IF V5=0 AND V4=1 THEN GOSUB 7300
4580 IF V5=1 AND V4=0 THEN GOSUB 7300
4590 IF V5=1 AND V4=1 THEN GOSUB 7200
4600 GOSUB 8500
4610 IFABS(B8)<900 AND ABS(B9)<900 THEN RETURN
4620 IF V3>33 THEN DISP "ERB-3" @ RETURN
4630 GOTO 4526
7000 ! UP0
```

```
7010 FOR I=1 TO M1
7020 OUTPUT 10 USING "#,B" ; O1(M)
7030 OUTPUT 10 USING "#,B" ; O2(M)
7040 NEXT I
7050 RETURN
7100 ! DOWN0
7110 FOR I=1 TO M1
7120 OUTPUT  10 USING "#,B" ; O3(M)
7130 OUTPUT 10 USING "#,B" ; O2(M)
7140 NEXT I
7150 RETURN
7200 ! UP90
7210 FOR I=1 TO M1
7220 OUTPUT 10 USING "#,B" ; O4(M)
7230 OUTPUT 10 USING "#,B" ; O5(M)
7240 NEXT I
7250 RETURN
7300 ! DOWN 90
7310 FOR I=1 TO M1
7320 OUTPUT 10 USING "#,B" ; O6(M)
7330 OUTPUT 10 USING "#,B" ; O5(M)
7340 NEXT I
7350 RETURN
7400 ! CLEAR
7405 OUTPUT 10 USING "#,B" ; O8(M)
7410 OUTPUT 10 USING "#,B" ; O7(M)
7420 OUTPUT 10 USING "#,B" ; O8(M)
7430 OUTPUT 10 USING "#,B" ; L1
7440 M9(M)=0 @ RETURN
7500 ! TOG
7505 OUTPUT 10 USING "#,B" ; O8(M)
7510 OUTPUT 10 USING "#,B" ; O9(M)
7520 OUTPUT 10 USING "#,B" ; O8(M)
7530 OUTPUT 10 USING "#,B" ; L1
7550 M9(M)=M9(M)+1
7560 RETURN
7600 !CAL
7605 DIM MB(4,8), THETA(4), THETAP(4), GC(4), TB(8),
     XB(8)
7610 OUTPUT 10 USING "#,B", L1+64
7620 OUTPUT 10 USING "#,B", L1
7630 RETURN
8000 ! READ MF
8020 OUTPUT 10 USING "#,B" ; L1-128
8080 OUTPUT 10 USING "#,B" ; L1+2
8100 CONTROL 10,2; 0 @ FOR I1=1 TO  2 @ NEXT I1
     @ CONTROL 10,2; 1
8120 ENTER 10 USING "#,K" ; S$
8130 FOR I=2 TO 16 STEP 2
8132 B(I)=NUM(S$[I,I])
8140 B(I-1)=NUM(S$[I-1,I-1])
8180 B(I/2)=BINAND(B(I),240)/16+B(I-1)*16-2048
8210 NEXT I
8230 OUTPUT 10 USING "#,B" ; L1
8300 RETURN
8500 ! SINGLE MOD ACQUISITION
```

```
8510 OUTPUT 10 USING "#,B" ; L1-128
8520 OUTPUT 10 USING "#,B" ; L1+2
8530 CONTROL 10,2; 0 @ FOR I1=1 TO 2 @ NEXT I1 @ CONTROL 10
     ,2 ; 1
8540 ENTER 10 USING "#,K" ; S$
8550 FOR l=4*M-2 TO 4*M STEP 2
8560 B(I)=NUM(S*[I,I])
8570 B(I-1)=NUM (S*[I-1,I-1])
8580 B(I/2)=BINAND(B(I),240)/16+B(I-1)*16-2048
8590 NEXT I
8600 B8=B(M*2-1) @ B9=B(M*2)
8610 RETURN
8700 !SUBROUTINE TO CALIBRATE
8705 GOSUB 7400
8707 FOR I4= 1 TO 4
8710 GOSUB 7600
8715 GOSUB 8000
8720 FOR I5=1 TO 8
8725 MB (I4,I5) = B(I5)
8730 NEXT I5
8735 NEXT I4
8740 GOSUB 7400
8743 FOR I4 = 2 TO 4
8745 FOR I = 1 TO 8
8750 MB (I4, I) = - MB (1,I) + MB (I4, I)
8755 NEXT I
8760 NEXT I4
8765 FOR I = 1 TO 4
8770 GC (1) = (MB(4, 2*I-1)/(MB(4,2*I) )
8775 NEXT I
8785 FOR I4=2 TO 3
8786 FOR I = 2 TO 8 STEP 2
8787 MB(I4,I) = GC (I/2) *MB(I4,I)
8790 NEXT I
8795 NEXT I4
8800 FOR I = 1TO 4
8805 THETA (I) = ATN (MB(2, 2*I) /MB(2,2*I-1) )
8810 THETAP(I) = ATN (MB(3,2*-1) /MB(3,2*I) )
8815 NEXT I
8820 RETURN
8840 ! CORRECTION TRANSFORM (APPEND TO DATA TABING)
8845 GOSUB 8000
8850 FOR I = 2 TO 8 STEP 2
8855 B(I) = B(I)*GC(I/2)
8860 NEXT I
8863 FOR I = 1 TO 4
8865 TB (2*I-1) = B(2*-1) * COS (-THETA (I) )
8870 TB(2*1) = B(2*I) * COS (-THETAP (I) )
8880 XB (2*I-1) = -B(2*I-1) *SIN(-THETAP(I) )
8890 XB (2*I) = TB(2*I) * SIN (-THETAP(I) )
8895 NEXT I
8900 FOR I = 1 TO 4
8905 B(2*I-1) = TB (2*I-1) +XB(2*I)
8910 B(2*I) = TB(2*I) * B(2*I-1)
8915 NEXT I
8920 RETURN
```

```
9000 ! RS232 INTERFACE CONTROL 4800 BAUD , 8 BITS & 2 STOP
     BITS NO PARITY
9010 CONTROL 10,3 ; 15
9020 CONTROL 10,4 ; 7
9030 CONTROL 10,2 ; 1
9040 CONTROL 10,9 ; 129
9045 OUTPUT 10 USING "#,B" ; 31
9050 OUTPUT 10 USING "#,B" ; L1
9060 OUTPUT 10 USING "#,B" ; L1-1
9070 OUTPUT 10 USING "#,B" ; L1
9080 CONTROL 10,9 ; 133
9090 RETURN
9800 ! ERROR TRAP
9810 IF ERRN=114 THEN GOSUB 9000
9820 DISP " ERROR ", ERRN
9830 WAIT 3000
9840 GOSUB 1000
9850 GOTO 490
```

SC PROGRAM LISTING

```
10 OPTION BASE 0
15 COM M9(4), L1,L2,L3,L7,L4,L5, L6,M,C(50,9),C1(50,9)
20 CLEAR ! MULTIPLE PROGRAM ACQUISITION
21 DISP "YOU MAY BRING IN THE MF PROGRAM BY PRESSING"
22 DISP "KEY 1- WHILE RETAINING THE SYSTEM STATUS AND"
23 DISP "DATA IN CURRENT MEMORY"
30 ON KEY # 1 GOTO 3750
40 KEY LABEL
50 GOTO 50
140 DIM S(21), M1(21),X(20),A(10, 20),K(20),K1(20),
    M(100),B(36,10),P1(100)
150 RAD
160 L9=1
170 DISP   "CYLINDRICAL MULTILAYER EDDY CURRENT ANALYSIS"
180 DISP "ENTER MEASUREMENT FREQUENCY"
190 INPUT B(1,L9)
191 DISP B(1,L9)
200 DISP "ENTER COIL RADIUS (ID) IN METERS"
210 INPUT B(2,L9)
211 DISP B(2,L9)
220 DISP "WHAT ARE THE MAXIMUM NUMBER OF LAYERS OF THE
    CONDUCTOR"
230 INPUT I
231 DISP I
232 FOR K=0 TO 3*I+6
233 B(K,0)=0
234 NEXT K
235 B(3,0)=1
240 B(0,L9)=1
250 A(0,4)=0
260 A(0,8)=0
270 A(1,4)=0
280 A(1,8)=0
290 M1(1)= .0000004*PI
300 M(0)=M1(1)
```

```
310 E=8.8541872E-12
311 B(0,1)=0
320 G= .5772156649
330 !"SELECT THE NUMBER OF THE BESSEL EXPANSION, ODD NUMBER
340 Z=21
350 FOR K=1 TO I
360 DISP "INPUT THE LAYER RADIUS IN METERS"
370 INPUT B(4+3*K,L9)
371 DISP B(4+3*K,L9)
380 DISP "INPUT THE ELECTRICAL CONDUCTIVITY OF LAYER",K,
    "IN MOHS/M"
390 INPUT B(5+3*K,L9)
391 DISP B(5+3*K,L9)
400 DISP "INPUT THE RELATIVE PERMEABILITY"
410 INPUT B(6+3*K,L9)
411 DISP  B(6+3*K,L9)
420 NEXT K
430 X(0)=B(2,L9)
440 FOR K=1 TO I
450 X(2*K-1)=B(4+3*K,L9)
460 X(2*K)=B(4+3*K,L9)
470 S(2*K)=B(5+3*K,L9)
480 S(2*K+1)=B(5+3*K,L9)
490 M1(2*K)=B(6+3*K,L9)*M1(1)
500 M1(2*K+1)=B(6+3*K,L9*M1(1)
510 NEXT K
520 W=2*PI*B(1,L9)
530 FOR J=2 TO 2*I
540 K(J)=SQR(W*S(J)*M1(J))
550 K1(J)=K(J)*X(J)
560 NEXT J
570 K(1)=W*SQR(E*M1(1))
580 K1(1)=K(1)*X(1)
590 K1(0)=K(1)*B(2,L9)
600 !THIS PROGRAM CALCULATES BESSEL FUNCTIONS USEFUL
    FOR EDDY CURRENT ANALYSIS
630 ! A(1 OR 0,1)= J1(K1)
640 ! A(1 OR 0,3)= J1'(K1)*K
650 ! A(1 OR 0,5)= Y1(K1)*K
660 ! A(1 OR 0,7)= Y1'(K1)*K
670 ! A(J>1,1)= beil(K1)
680 ! A(J>1,2)= -ber1(K1)
690 ! A(J>1,3)= Kbeil'(K1)
700 ! A(J>1,4)= -Kber1'(K1)
710 ! A(J>1,5)= -keil(K1)
720 ! A(J>1,6)= ker1(K1)
730 ! A(J>1,7)= -Kkeil(K1)
740 ! A(J>1,8)= Kker1'(K1)
770 M(0)=1
772 P1(0)=-(2*G)+1
780 FOR D=1 TO Z+2
790 M(D)=M(D-1)*D
792 P1(D)=P1(D-1)+1/D+1/(1+D)
800 NEXT D
810 FOR J=0 TO 10
820 FOR K=1 TO 8
```

```
830  A(J,K)=0
840  NEXT K
850  NEXT J
860  FOR J=2 TO 2*I
870  FOR L=0 TO Z
880  C=(-1)^L*K1(J)^(2*L+1)/(M(L)
890  B1=C*SIN(3*PI*(2*L+1)/4)
900  A(J,1)=A(J,1)+B1
910  B2=-(C*COS(3*PI*(2*L+1)/4))
920  A(J,2)=A(J,2)+B2
930  A(J,3)=A(J,3)+(2*L+1)*B1/X(J)
940  A(J,4)=A(J,4)+(2*L+1)*B2/X(J)
950  NEXT L
960  A(J,5)=SIN(3*PI/4)/K1(J)+LOG (K1(J)/2)*A(J,1)
     -PI*A(J,2)/4
970  A(J,6)=COS(3*PI/4)/K1(J)+LOG (K1(J)/2)*A(J,2)
     +PI*A(J,1)/4
980  A(J,7)=-(SIN(3*PI/4)/(K1(J)*X(J)))+A(J,1)/X(J)
     +LOG(K1(J)/2)*A(J,3)-PI*A(J,4)/4
990  A(J,8)=-(COS(*PI/4)/(K1(J)*X(J)))-A(J,2)/X(J)
     +LOG(K1(J)/2*A(J,4)+P1*A(J,3)/4
1000 FOR L=0 TO Z
1060 C=P1(L)*K1(J)^(2*L+1)/(M(L)*M(L+1)*2^(2*L+2))
1070 A(J,5)=A(J,5)-C*SIN(P1*( 75 +L/2))
1080 A(J,6)=A(J,6)+C*COS(PI*( 75 +L/2))
1090 A(J,7)=A(J,7)-C*(2*L+1)*SIN(PI*( 75+L/2))/X(J)
1100 A(J,8)=A(J,8)+C*(2*L+1)*COS(PI*( 75+L/2))/X(J)
1110 NEXT L
1120 NEXT J
1130 FOR J=0 TO 1
1140 FOR L=0 TO Z
1150 C=(-1)^L*K1(J)'(2*L+1)/2^(2*L+1)*M(L)*M(L+1))
1160 A(J,1)=A(J,1)+C
1170 A(J,3)=A(J,3)+(2*L+1)*C/X(J)
1180 NEXT L
1190 A(J,5)=-(2/(PI*K1(J)))+2*LOG(K1(J)/2)*A(J,1)/PI
1200 A(J,7)=2/(PI*K1(J)*X(J))+2*A(J,1)/(X(J)*PI)+2
     *LOG(K1(J)/2)*A(J,3)/PI
1210 FOR L=0 TO Z
1270 C=-(P1(L)*(-1)^L*(K1(J)/2^(2*L+1)/(M(L)*M(L+1)*PI))
1280 A(J,5)=A(J,5)+C
1290 A(J,7)=A(J,7)+C*(2*L+1)/X(J)
1300 NEXT L
1310 NEXT J
1320 FOR K=1 TO 2*I
1330 FOR J=3 TO 4
1340 A(K,J)=A(K,J)/M1(K)
1350 A(K,J+4)=A(K,J+4)/M1(K)
1360 NEXT J
1370 NEXT K
1380 T1=0
1390 T2=0
1400 FOR K=1 TO I
1410 L=I-K+1
1420 A1=A(2*L,3)+T1*A(2*L,7)-T2*A(2*L,8)
1430 A2=A(2*L,4)+T1*A(2*L,8)+T2*A(2*L,7)
```

```
1440 B1=A(2*L,1)+T1*A(2*L,5)-T2*A(2*L,6)
1450 B2=A(2*L,2)+T1*A(2*L,6)+T2*A(2*L,5)
1460 T3=A(2*L-1,1)*A1-A(2*L-1,2)*A2-A(2*L-1,3)*B1+
     A(2*L-1,4)*B2
1470 T4=A(2*L-1,2)*A1+A(2*L-1,1)*A2-A(2*L-1,3)*B2
     -A(2*L-1,4)*B1
1480 B3=A(2*L-1,7)*B1-A(2*L-1,8)*B2-A(2*L-1,5)*A1
     +A(2*L-1,6)*A2
1490 B4=A(2*L-1,7)*B2+A(2*L-1,8*B1-A(2*L-1,5)*A2
     -A(2*L-1,6)*A1
1500 Y=1/(B3*B3+B4*B4)
1510 T1=(T3*B3+T4*B4)*Y
1520 T2=(-(T3*B4)+T4*B3)*Y
1530 NEXT K
1570 S1=1+T1*A(0,5)/A(0,1)
1580 S2=T*A(0,5)/A(0,1)
1620 B(3,L9)=S1
1630 B(4,L9)=S2
1640 IF L9=1 THEN Z1=0
1641 IF L9=1 THEN 1670
1650 DISP "FOR THE REFERENCE STATE SUPPLY THE RUN #, FOR AN
          EMPTY COIL REFERENCE ENTER 0"
1660 INPUT Z1
1670 B5=B(3,L9)-B(3,Z1)
1680 B6=B(4,L9)-B(4,Z1)
1690 B(5,L9)=(B5∧ 2+B6' 2)∧ .5
1700 B(6,L9)=180/PI*ATN2(B6,B5)
1720 L9=L9+1
1730 FOR K=1 TO 3*I+6
1740 B(K,L9)=B(K,L9-1)
1750 NEXT K
1751 DISP "SKIN DEPTH FIRST LAYER"
1752 DISP 1/K(2)
1753 DISP "TO END RUN AND OUTPUT DATA ENTER 0,0,0"
1760 DISP "TO CHARGE FREQUENCY ENTER:   1,0,NEW FREQUENCY"
1770 DISP "TO CHANGE RADIUS ENTER:  2,LAYER, RADIUS
     (METERS)"
1780 DISP "TO CHANGE CONDUCTIVITY ENTER:   3, LAYER,
     CONDUCTIVITY"
1790 DISP "TO CHANGE MAG. PERM ENTER:   4, LAYER,
     REL. PERM."
1800 INPUT X1,X2,X3
1801 DISP "CHANGE 1:FREQUENCY, 2:RADIUS, 3: CONDUCTIVITY,
     4: PERM."
1802 DISP X1
1803 DISP "NEW VALUE"
1804 DISP X3
1805 DISP "LAYER"
1806 DISP X2
1810 IF X1=1 THEN B(1,L9)=X3
1820 IF X1=2 THEN B(4+3*X2,L9)=X3
1830 IF X1=3 THEN B(5+3*X2,L9)=X3
1840 IF X1=4 THEN B(6+3*X2,L9)=X3
1850 IF X1=0 THEN 2000
1855 IF X1#0 AND X1#1 AND (X1#2 AND X1#3 AND X1#4) THEN
     1760
```

```
1860 DISP "IF   THERE ANY FURTHER CHANGES PRIOR TO RUNNING
     ENTER 1  IF NONE ENTER 0"
1865 INPUT X4
1870 IF X4=0 THEN 440
1880 IF X4=1 THEN 1760
1885 IF X4=2 THEN 2000
1890 IF (X4#0 AND X4#1 AND X4#2)=1 THEN 1860
2000 !
2010 FOR K=1 TO L9-1
2011 DISP " RUN       SIGNAL AMPLITUDE"
2012 DISP K,B(5,K)
2013 DISP "PHASE ANGLE"
2014 DISP B(6,K)
2015 DISP " ABS ZERO  NINETY DEGREE COMPONENTS"
2016 DISP B(3,K)-1,B(4,K)
2030 NEXT K
2040 DISP "TO PLOT RESULTS ENTER 0 TO TERMINATE ENTER 1"
2050 INPUT X6
2070 IF X6=0 THEN 2100
2080 GOTO 2500
2100 GCLEAR
2110 SCALE -8,8,-6,6
2120 XAXIS 0,1
2130 YAXIS 0,1
2140 MOVE 2,4
2150 LABEL, "LOG PLOT"
2151 MOVE 1,5
2152 LABEL "90 DEG."
2153 MOVE 5,5
2154 LABEL "0 DEG."
2155 MOVE 2,3
2156 LABEL "CENTER 1E-6"
2160 FOR K=1 TO L9-1
2170 MOVE COS(B(6,K)*PI/180)*(LOG(B(5,K))+6),SIN(B(6,K)
     *PI/180)*(LOG(B(5,K))+6)
2180 LABEL "+"
2190 NEXT K
2500 GOTO 20
3750 CHAIN "MF"
3850 END
```

Accuracy Control Subsystem Summary

In one of its aspects, the invention looks to expedited balancing of a frequency-based OE system, i.e., a system having drive means for generating an object excitation signal of preselected frequency, a transducer for applying the excitation signal to the object and generating an output signal indicative of interaction of the signal with the object, and detection circuitry for generating output signals separately indicative of different phase components of the transducer output signal. To this end, the invention provides means connected to the detection circuitry for injecting first and second phase component correction signals into the detection circuitry to conform operation of same to within a preselected operating subrange thereof. Further means are introduced into the detection circuitry for combining the injection signals with the transducer output signals.

In its specifically depicted and described embodiment, the injection means includes a microcomputer implementing the balance routines of the MF program, the microcomputer having inputs comprising the detection circuitry output signals and applying up and down outputs controlling unit 228 of FIG. 3. Fundamental to this approach is that there occurs an initial activity wherein injection takes place successively by input to one of the two channels, to get one parameter in desired range. When one channel parameter is in range, injection then takes place jointly in both channels.

In another aspect, the invention provides calibration in apparatus of the type discussed above. Here, means are provided for connection to the detection circuitry for introducing linearity compensation, in effect signals for compensating for non-linearities which would otherwise be present at various locations in the dynamic operating subrange of the system, as above discussed in the Calibrate Mode. Here, multiplexer 181 cycles through its signal, ground, sine and cosine inputs to provide raw data for the calibration calculations which provide correction factors applicable to running measured data to compensate for nonlinearity in the operating subrange. This practice is implemented by the calibrate subroutine of the MF program.

Method aspects attend both of the discussed system aspects and further method of the invention is made available by the procedure for validating sensed data by the practice of the SC program. Here, one identifies preselected externally determinable characteristics of the transducer and the object, e.g., coil size, object radius, etc., and generates electrical signals indicative thereof. This is done by key entries in the SC program as called for by operator prompts. Validation signals indicative of a latent characteristic of the object are now generated by the SC program, independently of the transducer excitation and output signals and are available for comparison with the OE system output signals.

Various changes to the accuracy control subsystem described and variations in the methods discussed can be made without departing from the invention. As noted above, discussion of the accuracy control subsystem in the particular background of an OE system of eddy current type is for convenience and the invention is of course applicable generally to frequency-based object examination. The particularly illustrated and explained preferred embodiments and practices are thus intended in an illustrative and not in a limiting sense. The true spirit and scope of the invention are set forth in the following claims.

I claim:

1. An accuracy control subsystem for an object examination system of type including:
   (a) drive means for generating an excitation signal of preselected frequency;
   (b) transducer means for receiving said excitation signal and for applying said excitation signal to said object and for generating an output signal indicative of interaction of said excitation signal with said object; and
   (c) detector means for receiving said transducer means output signal and for generating first and second output signals indicative of components of said transducer means output signal at respective first and second different phases thereof, said subsystem including;
   (d) means for receiving said detector means first and second output signals for successively generating first and second phase component correction signals to conform operation of said detector means to within a preselected operating subrange thereof; and
   (e) means connected to said means (d) and connected within said detector means for combining said first and second phase component correction signals with said transducer means output signal.

2. The invention claimed in claim 1 wherein said means (d) includes circuit means for initial successive generation of said first and second phase component correction signals and subsequent concurrent generation of said first and second phase component correction signals.

3. The invention claimed in claim 2 wherein said first phase is zero degrees and said second phase is ninety degrees and wherein said first and second phase component correction signals are along respective orthogonal axes being X and Y.

4. The invention claimed in claim 3 wherein said circuit means initially generates X phase component correction signals and subsequently generates Y phase component correction signals and further subsequently generates concurrent X and Y phase component correction signals.

5. The invention claimed in claim 3 wherein said circuit means initially generates Y phase component correction signals and subsequently generates X phase component correction signals and further subsequently generates concurrent X and Y phase component correction signals.

6. An accuracy control subsystem for an object examination system of type including:
   (a) drive means for generating an excitation signal of preselected frequency;
   (b) transducer means for receiving said excitation signal and for applying said excitation signal to said object and for generating an output signal indicative of interraction of said excitation signal with said object; and
   (c) detector means for receiving said transducer means output signal and for generating first and second output signals respectively indicative of components of said transducer means output signal at first and second different phases thereof, said subsystem including;
   (d) signal generator means for generating in-phase and quadrature signals; and
   (e) signal injection means for separately injecting into said detector means said in-phase and quadrature signals and for determining nonlinearilty correction for said detector means output signals.

7. The system claimed in claim 3 wherein said means (d) further generates a predetermined amplitude test signal and an electrical ground potential signal and wherein said means (e) further injects into said detection circuitry at further distinct and separate times said predetermined amplitude test signal and said electrical ground potential signal.

8. The system claimed in claim 7 wherein said means (e) comprises a multiplexer circuit, having separate input terminals for respective receipt of said in-phase, said quadrature, said test signal and said ground signal and counter means for stepping said multiplexer to separately gate said in-phase, said quadrature, said test signal and said ground signal into said detection circuitry.

* * * * *